US008581705B2

(12) United States Patent
Stewart

(10) Patent No.: US 8,581,705 B2
(45) Date of Patent: Nov. 12, 2013

(54) COMBINATION FULL-DUPLEX AND HALF-DUPLEX ELECTRONIC IDENTIFICATION TAG

(75) Inventor: Robert Stewart, Boulder, CO (US)

(73) Assignee: Allflex USA, Inc., DFW Airport, TX (US)

( * ) Notice: Subject to any disclaimer, the term of this patent is extended or adjusted under 35 U.S.C. 154(b) by 617 days.

(21) Appl. No.: 12/554,743

(22) Filed: Sep. 4, 2009

(65) Prior Publication Data
US 2010/0052869 A1 Mar. 4, 2010

Related U.S. Application Data

(60) Provisional application No. 61/094,173, filed on Sep. 4, 2008.

(51) Int. Cl.
G06K 7/01 (2006.01)
(52) U.S. Cl.
USPC ............... 340/10.34; 340/10.1; 340/10.42; 340/10.52; 340/572.1; 370/277
(58) Field of Classification Search
USPC ............... 340/10.1, 10.5, 10.51, 10.4, 10.41, 340/10.42, 10.52, 572.1, 10.34; 370/277
See application file for complete search history.

(56) References Cited

U.S. PATENT DOCUMENTS

| 1,744,036 A | 1/1930 | Brard |
| 3,299,424 A | 1/1967 | Vinding |
| 3,713,148 A | 1/1973 | Cardullo et al. |
| 3,995,234 A | 11/1976 | Tuccinardi |
| 5,053,774 A | 10/1991 | Schuermann et al. |

(Continued)

FOREIGN PATENT DOCUMENTS

| EP | 0783158 B1 | 4/2004 |
| WO | 03/085617 A1 | 10/2003 |

OTHER PUBLICATIONS

International Search Report for International Application No. PCT/US2009/056110, date completed Oct. 21, 2009, mailed Oct. 29, 2009, 3 pgs.

(Continued)

Primary Examiner — Edwin Holloway, III
(74) Attorney, Agent, or Firm — KPPB LLP

(57) ABSTRACT

Transponders are disclosed that are configurable to operate in an HDX mode and/or an FDX-B mode and that use a switchable load impedance across the transponders' resonant antenna circuit to induce amplitude and/or frequency modulation. An RF level detection circuit determines when the instantaneous activation signal strength is sufficient to support monoplex, multiplex, and diplex operation. A non-volatile memory stores identification data coded in HDX and FDX-B formats. One embodiment of the invention includes an inductive antenna including two terminals connected to tag circuitry, where the inductive antenna forms a resonant antenna circuit tuned to resonate at the frequency of the activation signal. In addition, the tag circuitry includes a non-volatile memory, the tag circuitry and the resonant antenna circuitry are configurable as an oscillator, the tag circuitry is configured to be powered by electric current induced in the resonant antenna circuit by the activation signal, the tag circuitry includes at least one switchable load impedance connected across the antenna resonant circuit, the tag circuitry is configurable to amplitude modulate the activation signal appearing at the resonant antenna circuit terminals using a switchable load impedance, and the tag circuitry is configurable to frequency shift key modulate the oscillator signal appearing at the resonant antenna circuit terminals using a switchable load impedance.

5 Claims, 10 Drawing Sheets

(56) References Cited

U.S. PATENT DOCUMENTS

| | | | |
|---|---|---|---|
| 5,218,343 | A | 6/1993 | Stobbe et al. |
| 5,302,954 | A | 4/1994 | Brooks et al. |
| 5,349,649 | A | 9/1994 | Iijima |
| 5,451,958 | A * | 9/1995 | Schuermann ............... 342/42 |
| 5,517,194 | A * | 5/1996 | Carroll et al. ............ 340/10.34 |
| 5,530,232 | A | 6/1996 | Taylor |
| 5,602,744 | A | 2/1997 | Meek et al. |
| 6,249,212 | B1 | 6/2001 | Beigel et al. |
| 2001/0048361 | A1 | 12/2001 | Mays et al. |
| 2005/0099269 | A1 * | 5/2005 | Diorio et al. ............ 340/10.51 |
| 2006/0279406 | A1 * | 12/2006 | Stewart et al. ............ 340/10.1 |
| 2007/0276294 | A1 | 11/2007 | Gupta et al. |

OTHER PUBLICATIONS

Written Opinion of the International Searching Authority for International Application No. PCT/US2009/056110, date completed Oct. 21, 2009, mailed Oct. 29, 2009, 8 pgs.

Finkenzeller, "Components of an RFID System", RFID Handbook Radio-Frequency Identification Fundamentals and Applications, 1999, 5 pgs.

"International Standard—ISO 11784—Radio-frequency identification of animals—Code structure", ISO 11784; Aug. 15, 1996, second edition, 5 pgs.

"International Standard—ISO 11785—Radio-frequency identification of animals—Technical concept", ISO 11785, Oct. 15, 1996, First edition, 20 pgs.

* cited by examiner

ISO FDX-B Transponder Modulation Scheme

ISO HDX Transponder Modulation Scheme

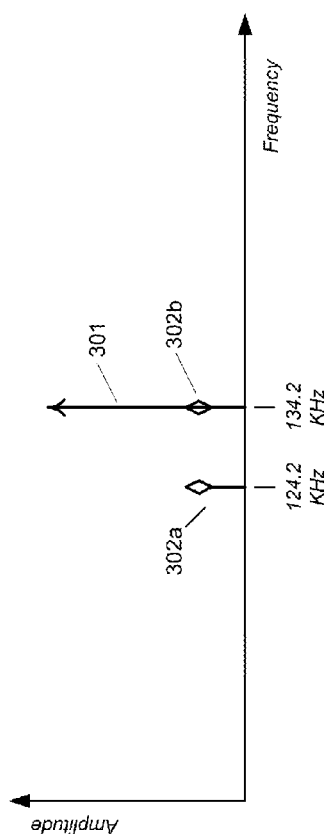
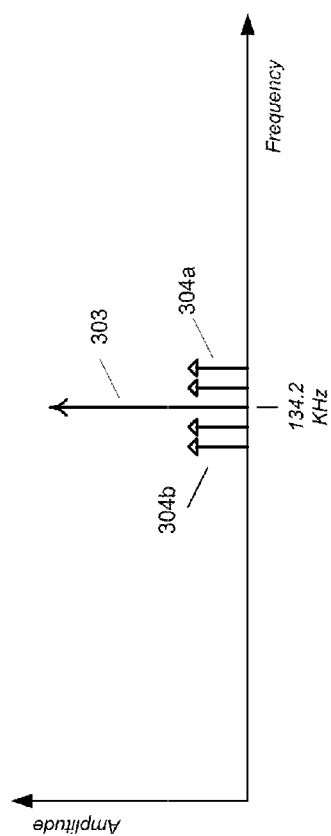
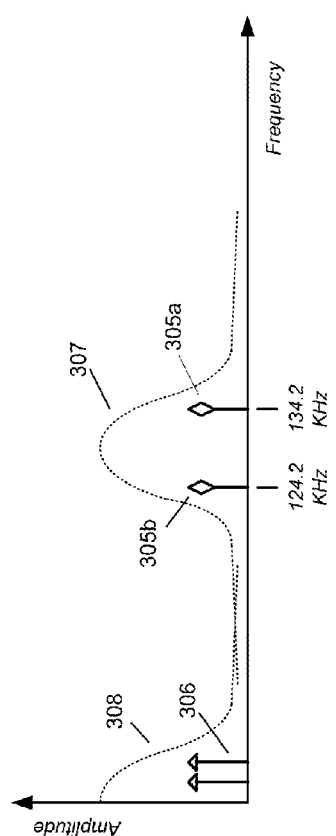
Fig. 3a
Prior Art
Fig. 3b
Prior Art
Fig. 3c
Prior Art

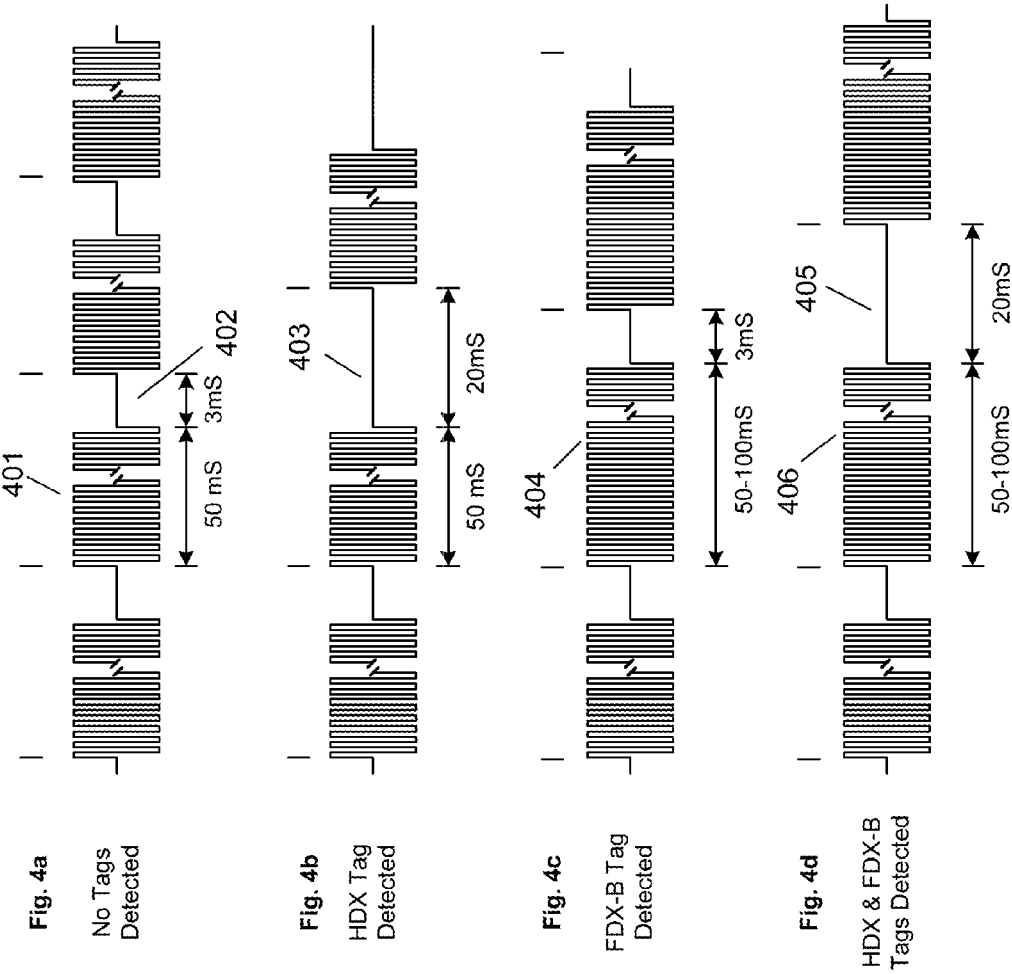

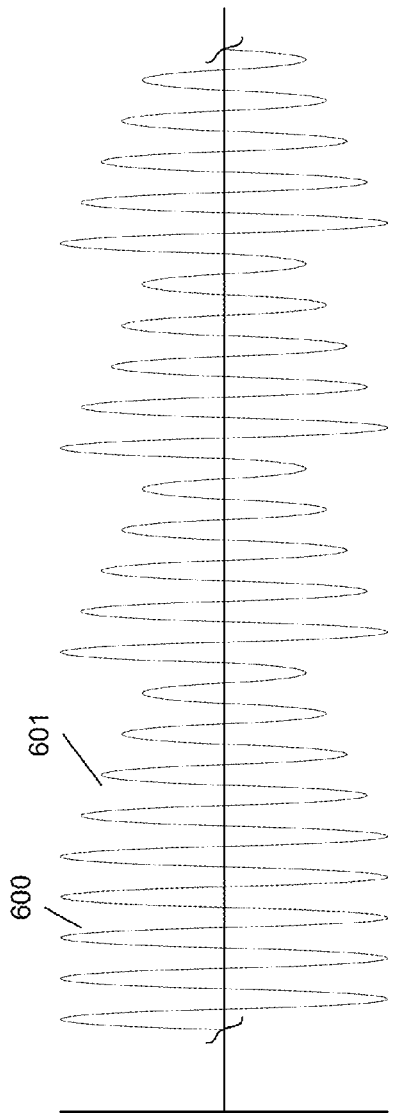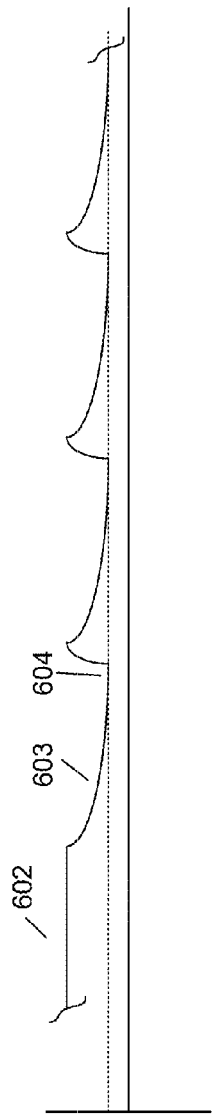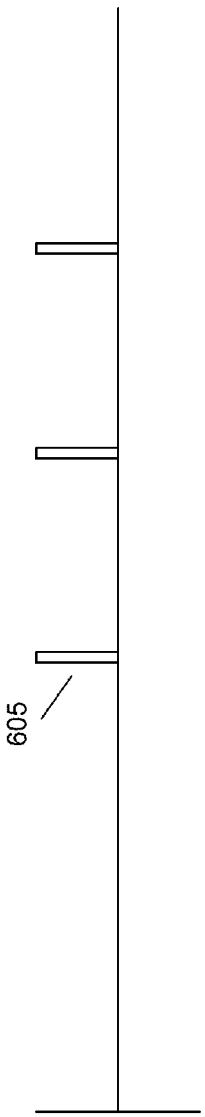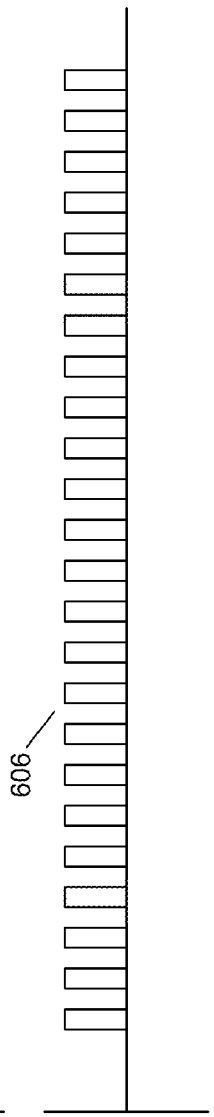

COMBINATION FULL-DUPLEX AND HALF-DUPLEX ELECTRONIC IDENTIFICATION TAG

CROSS-REFERENCE TO RELATED APPLICATIONS

The present application claims priority to U.S. Provisional Patent No. 61/094,173 entitled "Combination HDX/FDX-B Electronic Identification Tag" to Stewart, filed Sep. 4, 2008. The disclosure of U.S. Provisional Patent No. 61/094,173 is incorporated by reference herein in its entirety.

FIELD OF THE INVENTION

The present invention relates to the field of electronic radio frequency identification and, more specifically, to an electronic ID tag in which a binary identification code is embedded and that is capable of responding to an ISO 11785 compliant interrogator with FDX-B and HDX transponder signals.

BACKGROUND

Radio frequency identification concepts and technology date back nearly 80 years, and since then, RFID principles have been used in a wide variety of automatic identification applications. The same principles of inductively coupled power and data have been used in related fields such as medical and industrial telemetry, IC cards for financial transactions and security access, anti-shoplifting systems, tollway payment systems, and inventory tracking. RFID used for animal identification was pioneered at The Los Alamos Scientific Laboratory in the late 1970's. In the 1980's, RFID animal identification systems became commercially viable, and several suppliers developed similar, but mutually incompatible, products for tagging animals and reading identification codes.

Government interest in RFID animal identification developed in the late 1980's with the formation of the European Union and ensuing concerns about potentially uncontrolled transport of animals across international borders. In response, the International Standards Organization was chartered in the early 1990's with developing an international standard based on one or more of the existing RFID technologies, with the intent of identifying all livestock with RFID tags. A practicable and operable international identification system requires a standard RFID system, rather than a proliferation of the multiple mutually incompatible proprietary systems. After several years of research, investigation, and negotiation, ISO published Standards 11784 and 11785.

The multitude of mutually incompatible RFID systems has, however, remained, and has even expanded with the introduction of systems operating in other frequency bands, such as 13.56 MHz, for example. Suppliers of RFID components have responded by providing integrated circuits (ICs) and interrogators that are capable of operability in compliance with these various mutually incompatible systems. For example, many commercially available RFID transponder ICs can be programmed with any identification code, and can be configured to be compatible with an ISO interrogator or with any one of several proprietary interrogators. Several transponder ICs from manufacturers such as Atmel Corporation of San Jose, Calif., EM Microelectronic—US, Inc. of Colorado Springs, Colo. and NXP Semiconductors Netherlands B.V., of Eindhoven, Holland illustrate such configurable devices, and numerous patents including U.S. Pat. No. 5,218,343 to Stobbe, et al., U.S. Pat. No. 5,053,774 to Schuermann, et al., U.S. Pat. No. 5,602,744 to Meek, et al., U.S. Pat. No. 5,349,649 to Iijima, U.S. Pat. No. 5,302,964 to Brooks, et al., U.S. Pat. No. 5,530,232 to Taylor, and U.S. Pat. No. 6,249,212 to Beigel, et al. track this evolution.

ISO Standard 11785 defines the technical principles for communications between interrogators (alternately referred to as "readers" or "scanners") and two types of electronic passive identification transponders, and ISO 11784 defines the allocation of transponder memory bits for identification purposes. These transponders contain identification information stored in binary form, which is conveyed to the interrogator when a transponder is suitably activated by the interrogator. Additional technical details are provided in ISO Standards 11784 and 11785, the disclosure of which is incorporated into this disclosure by reference in its entirety.

ISO 11784 and 11785 relate to radio frequency identification (RFID) systems, comprising low frequency interrogator devices and passive inductively powered identification tags. In RFID systems of this type, the interrogator generates a tag activation signal, and receives an identification data signal from the ID tag. ISO 11785 specifies a periodic activation signal (a burst-mode carrier) which prompts an FDX-B tag to respond during the interval in which the carrier is present, and which prompts an HDX tag to respond during the interval in which the carrier is absent.

Passive low frequency RFID interrogators and tags use operating principles that are well-know to those of ordinary skill in the art, and that are described in extensive detail in several seminal inventions, including U.S. Pat. No. 1,744,036 (Brard—1930), U.S. Pat. No. 3,299,424 (Vinding—1967), U.S. Pat. No. 3,713,146 (Cardullo—1973), and U.S. Pat. No. 5,053,774 (Schuermann—1991), and in textbooks such as "RFID Handbook" (Finkenzeller—1999).

As depicted in FIG. 1, the interrogator 100 includes electronic circuitry, which generates an activation signal (usually a single frequency unmodulated sinusoidal signal) using a signal source 101 and an amplifier 102 to drive a resonant antenna circuit 103. This activation signal manifests as a time-varying electromagnetic field, which couples with the ID tag 105 by means of the electromagnetic field's magnetic field component 104. The ID tag 105 converts this magnetic field into an electrical voltage and current, and uses this electrical power to activate its internal electronic circuitry. Using any of several possible modulation schemes, the ID tag conveys binary encoded information stored within it back to the interrogator via magnetic field 104, where the detector and utilization circuit 106 convert this binary code into typically decimal, hexadecimal, or alphanumeric format tag data 107 in accordance with some prescribed application.

ISO Standard 11785 defines two types of transponder technologies, which are designated "full-duplex" ("FDX-B") and "half-duplex" ("HDX"). In the described manners that follow, for HDX and FDX-B transponders, respectively, activation energy is transferred to the transponder from the interrogator, and identification code information is transferred to the interrogator from the transponder through the mutual coupling of a magnetic field.

The FDX-B transponder amplitude modulates the interrogator's activation signal with its binary identification code sequence. The interrogator detects this modulation and derives from it the FDX-B transponder's identification code. The term "full-duplex" derives from the FDX-B transponder's behavior wherein its identification code information is transmitted simultaneously during receipt of the activation signal from the interrogator.

In contrast, the HDX transponder uses the interrogator's activation signal to charge an internal capacitor (which functions as a very small rechargeable battery), and it uses this stored energy to activate a transmitter, which emits a frequency shift keyed ("FSK") signal representative of the transponder's identification code. The interrogator detects this FSK signal and derives from it the HDX transponder's identification code. The term "half-duplex" derives from the HDX transponder's behavior wherein the exchange of the activation signal and the identification code signal occur during alternate time intervals.

An ISO 11785 compliant interrogator has the capability to activate and detect both FDX-B and HDX type transponders. To accomplish this, the ISO compliant interrogator transmits an activation signal, consisting of a 134.2 kilohertz (KHz) sinusoid, which is switched ON and OFF in a prescribed cadence in accordance with ISO 11785. During the interval in which the 134.2 KHz carrier is ON, the FDX-B transponder is activated and it transmits its identification code signal cyclically for as long as the carrier signal is present. During this ON interval also, an HDX transponder charges it internal capacitor. Subsequently, during the interval in which the 134.2 KHz carrier signal is OFF, the FDX-B transponder is dormant, and the HDX transponder transmits its identification code sequence once.

The FDX-B transponder communicates to the interrogator by amplitude modulating the activation signal it receives. Amplitude modulation imposes variations on the activation signal's magnitude, and the interrogator is equipped with sensing circuitry capable of detecting these magnitude variations. This reflected signaling is somewhat analogous to shining a light beam on a distant mirrored surface and inducing a motion to the mirrored surface, which varies the amount of light that is reflected back to the light source.

An HDX transponder, in contrast, contains its own micro-transmitting capability, which is powered with energy received and stored from the interrogator's activation signal. Once the activation signal ceases, the HDX transponder emits a very small strength internally generated radio signal, comprising a frequency shift keyed ("FSK") modulation scheme. Specifically, the binary identification code information contained in the HDX tag is serially output such that the occurrence of a binary "1" results in the HDX tag's radio signal being 124.2 KHz and a binary "0" results in the tag's radio signal being 134.2 KHz. Thus, a corresponding analogy for HDX might include a light source that briefly illuminates a solar cell that charges a battery. When the light source extinguishes, the charge stored in the battery is used to alternately illuminate a red light source and a blue light source in accordance with some prescribed sequence.

FIG. 2a provides a block diagram illustration of an ISO identification tag. Although FDX-B and HDX transponders have different internal circuit designs supportive of their respective behaviors, the operation of both can be described using this generic block diagram. For simplicity, the powering circuitry is omitted.

Referring to the block diagram of FIG. 2a, and to the FDX-B waveforms of FIG. 2b, an FDX-B tag receives an activation signal which manifests as a 134.2 KHz sinusoidal voltage $F_o$ 204 illustrated in FIG. 2b-1 across the terminals 205a, 205b of the Resonant Antenna Circuit 201, comprising antenna L 202 and capacitor C 203. A portion of this voltage is converted to direct current (DC) and is used to power the tag's circuitry 200. Another portion of the sinusoidal voltage $F_o$ 204 is converted to a digital pulse signal $F_1$ 207 by Clock Generator 206 and is used to clock the tag's digital circuitry. The output of the clock generator, $F_1$ 207 is reduced by the Frequency Divider 208 by a factor of 32 to produce signal $F_{BR}$ 209 of approximately 4194 Hz. This signal frequency establishes the bit rate of the tag, and it is used to clock data out of the ID Code Memory 210, wherein the data resides as a sequence of binary 1's and 0's as is illustrated in FIGS. 2b-2, and 2b-3. In other words, for every 32 input pulses of the digital pulse signal $F_1$ 207, a new identification code data bit (FIGS. 2b-2, 2b-3) is output from the ID Code Memory 210.

As the binary 1's and 0's 211 are output from the ID Code Memory 210, they pass through an Encoder 212, which bi-phase encodes the data. This transformation converts a binary 1 into a binary 1 or a binary 0 having a full bit width duration, and converts a binary 0 into a binary 1/0 or 0/1 pair having a full bit width duration (see FIG. 2b-4). The output 213 of the Encoder 212 is applied to the Modulation Switch $S_M$ 215, which opens and closes in response to binary 0's and 1's, respectively, from the Encoder signal 213. With switch $S_M$ 215 closed, Load Impedance $Z_M$ 216 is connected across the Resonant Antenna Circuit 201, which has the effect of attenuating the amplitude of sinusoidal signal $F_o$ 204. This results in an amplitude modulated signal, such as the amplitude modulated signal illustrated in FIG. 2b-5. This amplitude modulation is detected by the interrogator, and is converted back to binary 1's and 0's and thereby the identification code information contained in the tag's ID Code Memory 210 is recovered.

Referring again to the block diagram of FIG. 2a, and to the HDX waveforms of FIG. 2c, an HDX tag receives an activation signal from the interrogator which manifests as a 134.2 KHz sinusoidal voltage $F_o$ 204 illustrated in FIG. 2c-1 appearing across the terminals 205a, 205b of the Resonant Antenna Circuit 201. This voltage is converted to direct current and powers a portion of tag circuitry 200 that controls the accumulation of electrical charge in a capacitor (not shown) and also holds the tag in a suspended communication state. When the HDX tag power control circuitry (not shown) has detected that the sinusoidal voltage $F_o$ has diminished in amplitude, the HDX tag enters its transmission active state.

The Clock Generator 206 in the HDX tag, in conjunction with the Resonant Antenna Circuit 201 includes a ringing oscillator, that continues to oscillate at its natural frequency, (which is approximately the same as the activation signal frequency $F_o$,) when $F_o$ 204 ceases. A ringing oscillator operates in a manner very much like a musical instrument's string, which is periodically plucked so that is remains oscillating. Such a ringing oscillator is disclosed in U.S. Pat. No. 3,995,234, the disclosure of which is incorporated herein by reference in its entirety. The oscillator output $F_1$ 207 is applied to the frequency divider which reduces $F_1$ 207 by a factor of 16, which in turn becomes signal $F_{BR}$ 209 having approximate frequency 8387 Hz. This frequency establishes the bit rate of the tag, and it is used to clock Binary Data 211 out of the ID Code Memory 210, wherein the Binary Data 211 resides as a sequence of binary 13 s and 0's (see for example FIGS. 2c-2, 2c-3). In other words, for every 16 input pukes of $F_1$ 207, a new identification code Binary Data bit is output from the ID Code Memory 210.

Binary 1's and 0's, such as the binary data illustrated in FIGS. 2c-2, 2c-3, are clocked out of the ID Code Memory 210 and bypass the Encoder 212 so that Binary Data 211, 213 is applied directly to Modulation Switch $S_M$ 215. Switch $S_M$ 215 opens and closes in response to the binary 0's and 1's, respectively. In an HDX transponder, Load Impedance $Z_M$ 216 is typically a capacitive element that is connected across the Resonant Antenna 201 when switch $S_M$ 215 closes in response to a binary 1. This capacitor $Z_M$ 216 has the effect of altering the effective resonant frequency of the Resonant Antenna 201 thereby altering the operating frequency of the ringing oscillator to 124.2 KHz. Consequently, the oscillator output $F_1$ 207 becomes 124.2 KHz, which is reduced by a factor of 16 by the Frequency Divider 208 to produce the signal $F_{BR}$ 209 having the approximate frequency 7762 Hz. As shown in FIG. 2c-4, the ringing oscillator changes its frequency between 134.2 KHz and 124.2 KHz in response to binary 0's and 1's, thus creating a frequency shift keyed (FSK) sinusoidal signal (see for example FIG. 2c-4) that appears across the resonant antenna circuit 201. As can be seen from FIG. 2c-4, the period of a binary 1 is greater (about 129 used than the period of a binary 0 (about 119 usec), since the bit rate is determined by dividing the ringing oscillator's instantaneous frequency (either 134.2 KHz or 124.2 KHz) by 16.

FIGS. 3a and 3b illustrate the frequency spectral characteristics of the RFID system pertaining to ISO 11785 and to the present invention. FIG. 3a shows the spectra for the HDX tag, where the activation signal 301 appears at 134.2 KHz, and where the HDX transponder frequencies appear at 124.2 KHz 302a and 134.2 KHz 302b. Since the activation signal 301 and the HDX transponder signals 302a, 302b alternate in time, the 134.2 KHz activation signal 301 and the 134.2 KHz transponder signal 302a, 302b do not occur simultaneously. Thus, the interrogator's receive circuitry is able to detect the transponder data signal without being interfered with by its own activation signal.

FIG. 3b shows the spectra for the FDX-B tag, where the activation signal 303 appears at 134.2 KHz, and where the FDX-B transponder's amplitude modulation appears as sidebands close to the 134.2 KHz 304a, 304b. As is known to those of ordinary skill in the art, amplitude modulation sidebands appear symmetrically around the modulated carrier signal, and for FDX-B specifically, these sidebands appear at ±2.097 KHz and ±4.194 KHz. Because the activation signal 303 frequency and the data signal 304a, 304b frequencies are distinct, they can occur simultaneously, and the interrogator is able to separate them, thereby recovering the data contained therein. Removal of the 134.2 KHz carrier through envelope detection results in the translation of these data frequencies as shown in FIG. 3c. As can be observed, HDX 305a, 305b and FDX-B 306 tag signal spectra occupy different frequency bands 307, 308, and are thus frequency diverse.

Referring to FIG. 4, ISO 11785 also specifies a periodic activation signal having an adaptive timing characteristic that depends on the interrogator's instantaneous detection of an HDX or an FDX-B tag, the purpose of which is to increase the effective interrogation rate, and thereby improve reading speed. Specifically, this adaptive timing scheme requires the following:

[FIG. 4a] The interrogator activation signal default cycle time is 50 msec ON (401) and 3 msec OFF (402) when neither FDX-B nor HDX transponders are being read, but are being searched for.

[FIG. 4b] If, during the 3 msec OFF interval (402), an HDX transponder signal is sensed by the interrogator, the interrogator extends the OFF interval (402) to 20 msec (403) in order to completely capture and read the HDX transponder's identification code.

[FIG. 4c] If, during the 50 msec ON interval (401), an FDX-B transponder signal is sensed by the interrogator, the interrogator may extend the ON interval (401) up to 100 msec (404), if necessary, to completely capture and read the FDX-B transponder's identification code.

[FIG. 4d] If both tags are sensed during their respective transmission intervals (401, 402) the OFF interval (402) is extended to 20 msec, (405) and the ON interval (401) may be extended up to 100 msec (406).

In addition, every tenth activation signal cycle has ON and OFF intervals fixed at 50 msec ON and 20 msec OFF, regardless of transponder sensing and reading status. Thus, an interrogator may exhibit four activation signal ON/OFF cadences:
  a) No tag being sensed: 50 msec ON/3 msec OFF
  b) HDX tag sensed and read: 50 msec ON/20 msec OFF
  c) FDX-B tag sensed and read: 50 to 100 msec ON/3 msec OFF
  d) FDX-B and HDX tags sensed and read: 50 to 100 msec ON/20 msec OFF

SUMMARY OF THE INVENTION

Electronic identification tags in accordance with embodiments of the invention are intended for use with ISO 11785 compatible interrogators, that can transmit an identification code in compliance with both FDX-B and HDX tag signal protocols. In many embodiments of the invention, a combined FDX-B and HDX tag is provided that is programmed with a single ISO compatible identification code. However, several embodiments of the invention do not require or limit the FDX-B and HDX identification codes to being identical, nor do the codes necessarily need to be in compliance with the ISO 11874 code structure specifications. In a number of embodiments of the present invention, a combined FDX-B and HDX tag is provided that can be read by a non-ISO compliant interrogator. For example, an interrogator that reads only one of either FDX-B or HDX type tags is able to read the corresponding tag identification when it is transmitted in the corresponding format by the tag of the present invention.

A further aspect of embodiments of the invention is to provide a combined FDX-B and HDX identification tag that responds to a periodic activation signal comprising ON and OFF intervals of a 134.2 KHz alternating magnetic field with an FDX-B compliant tag signal during the activation signal ON interval, and with an HDX compliant tag signal during the activation signal OFF interval.

A still further aspect of embodiments of the invention is to provide a combined FDX-B and HDX identification tag that uses simple load modulation of tag's resonant antenna circuit by the tag's identification code binary data to achieve both FDX-B and HDX tag signal generation.

A yet further aspect of embodiments of the invention is to provide a means and method of power management within the tag during the activation signal ON and OFF intervals so that optimum power is available during both FDX-B and HDX signal transmission intervals, and so that the tag achieves reading distance performances that are equivalent to individual FDX-B and HDX tags.

A still yet further aspect of embodiments of the invention is to automatically adapt the tag's operating mode when available power is insufficient to provide for both FDX-B and HDX transmitting modes, and to provide a selection of such operating modes that are configurable to best suit an application.

Yet another aspect again of embodiments of the invention is to provide a combined FDX-B and HDX identification tag that can be configured as an FDX-B only, an HDX only, or an FDX-B and HDX tag.

Yet another additional aspect of embodiments of the invention is to provide a combined FDX-B and HDX identification tag in which at least one, and preferably both, identification codes are transmitted in their entirety within a single interrogation cycle.

Yet another further aspect of embodiments of the invention is to provide a combined FDX-B and HDX identification tag that improves the reading reliability of an ISO compatible tag and interrogator system by exploiting the frequency diversity of the HDX and FDX-B tag signals.

Yet another further additional aspect of embodiments of the invention is to provide a combined FDX-B and HDX identification tag that improves reading speed of an ISO compatible tag and interrogator system by transmitting the identification code with a higher repetition rate than is achieved by either an FDX-B tag or an HDX tag.

One embodiment of the invention includes an inductive antenna including two terminals connected to tag circuitry, where the inductive antenna forms a resonant antenna circuit tuned to resonate at the frequency of the activation signal. In addition, the tag circuitry includes a non-volatile memory, the tag circuitry and the resonant antenna circuitry are configurable as an oscillator, the tag circuitry is configured to be powered by electric current induced in the resonant antenna circuit by the activation signal, the tag circuitry includes at least one switchable load impedance connected across the antenna resonant circuit, the tag circuitry is configurable to amplitude modulate the activation signal appearing at the resonant antenna circuit terminals using a switchable load impedance, and the tag circuitry is configurable to frequency shift key modulate the oscillator signal appearing at the resonant antenna circuit terminals using a switchable load impedance.

In a further embodiment, the non-volatile memory contains full-duplex identification data, and the tag circuitry is configured so that the tag circuitry amplitude modulates the activation signal with a sequence indicative of the full-duplex identification data.

In another embodiment, the tag circuitry is configured so that the tag circuitry is inhibited from transmitting a frequency shift keyed signal during an interval in which the activation signal is absent.

A still further embodiment also includes a charge capacitor connected to the tag circuitry, and the tag circuitry is configured to store electrical current induced in the inductive antenna by the activation signal on the charge capacitor.

In still another embodiment, the tag circuitry is configured to utilize charge stored on the charge capacitor to power the tag circuitry.

In a yet further embodiment, the tag circuitry is configured to increase the modulation index of at least a portion of the amplitude modulated activation signal when the tag circuitry is powered by charge stored on the charge capacitor during the amplitude modulation.

In yet another embodiment, the non-volatile memory includes half-duplex identification data, and the tag circuitry is configured so that the tag circuitry utilizes charge stored on the charge capacitor to transmit a frequency shift keyed signal indicative of the half-duplex identification data during an interval in which the activation signal is absent.

In a further embodiment again, the tag circuitry is configured so that the tag circuitry amplitude modulates the activation signal with a sequence indicative of the full-duplex identification data and transmits a frequency shift keyed signal indicative of the half-duplex identification data during alternating repetitions of the interrogation cycle.

In another embodiment again, the tag circuitry includes an RF threshold detector that configures the tag circuitry to amplitude modulate the activation signal with a sequence indicative of the full-duplex identification data and transmit a frequency shift keyed signal indicative of the half-duplex identification data during alternating repetitions of the interrogation cycle in response to the activation signal inducing a potential difference across the terminals of the inductive antenna exceeding a predetermined threshold.

In a further additional embodiment, the tag circuitry is configured to utilize charge stored on the charge capacitor to increase the modulation index of at least a portion of the amplitude modulated activation signal when the tag circuitry is powered by charge stored on the charge capacitor during the amplitude modulation.

In another additional embodiment, the RF threshold detector configures the tag circuitry to store charge on the charge capacitor to increase the amplitude of at least a portion of the amplitude modulated activation signal in response to the activation signal inducing a potential difference across the terminals of the inductive antenna exceeding a predetermined threshold.

In a still yet further embodiment, the tag circuitry is configured so that the tag circuitry amplitude modulates the activation signal with a sequence indicative of the full-duplex identification data and transmits a frequency shift keyed signal indicative of the half-duplex identification data during each repetition of the interrogation cycle.

In still yet another embodiment, the tag circuitry includes an RF threshold detector that configures the tag circuitry to amplitude modulate the activation signal with a sequence indicative of the full-duplex identification data and transmit a frequency shift keyed signal indicative of the half-duplex identification data during each repetition of the interrogation cycle in response to the activation signal inducing a potential difference across the terminals of the inductive antenna exceeding a predetermined threshold.

In a still further embodiment again, the tag circuitry is configured to utilize charge stored on the charge capacitor to increase the modulation index of at least a portion of the amplitude modulated activation signal when the tag circuitry is powered by charge stored on the charge capacitor during the amplitude modulation.

In still another embodiment again, the tag circuitry includes an RF threshold detector that configures the tag circuitry to store charge on the charge capacitor to increase the modulation index of at least a portion of the amplitude modulated activation signal in response to the activation signal inducing a potential difference across the terminals of the inductive antenna exceeding a predetermined threshold.

In a still further additional embodiment, the non-volatile memory also includes half-duplex identification data, and the tag circuitry is configured so that the tag circuitry utilizes charge stored on the charge capacitor to transmit a frequency shift keyed signal indicative of the half-duplex identification data during an interval in which the activation signal is absent.

In still another additional embodiment, the tag circuitry is configured so that the tag circuitry is inhibited from amplitude modulating the activation signal during an interval in which the activation signal is present.

A yet further embodiment again includes an inductive antenna including two terminals connected to tag circuitry, where the tag circuitry is configured to combine with the inductive antenna to form a resonant antenna circuit tuned to resonate at the frequency of the activation signal, and a charge capacitor connected to the tag circuitry. In addition, the tag circuitry includes a non-volatile memory containing full-duplex identification data and half-duplex identification data, the tag circuitry includes an RF threshold detector configured to determine the magnitude of the potential difference induced across the terminals of the inductive antenna by the activation signal, the tag circuitry is configured to be powered by electric current induced in the inductive antenna by the activation signal, the tag circuitry includes at least one switchable load impedance connected across the antenna resonant circuit, the tag circuitry and the resonant antenna circuitry are configurable as an oscillator, the tag circuitry is configured so that the tag circuitry amplitude modulates the activation signal using a switchable load impedance with a sequence indicative of the full-duplex identification data when the RF threshold detector detects that the amplitude of the potential difference induced across the terminals of the inductive antenna is below a full-duplex mode threshold, the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during alternating repetitions of the interrogation cycle when the RF threshold detector detects that the amplitude of the potential difference induced across the terminals of the inductive antenna is at least above the full-duplex mode threshold and is below an multiplex mode threshold, and the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during each repetition of the interrogation cycle when the RF threshold detector detects that the amplitude of the potential difference induced across the terminals of the inductive antenna is at least above the multiplex mode threshold.

In yet another embodiment again, the tag circuitry is configured to store at least some of the electric current induced in the inductive antenna by the activation signal, the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the full-duplex mode threshold and is below a full-duplex enhanced mode threshold, the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the multiple mode threshold and is below the multiplex enhanced mode threshold, and the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above a diplex mode threshold.

A yet further additional embodiment includes an inductive antenna including two terminals connected to tag circuitry, where the tag circuitry is configured to combine with the inductive antenna to form a resonant antenna circuit tuned to resonate at the frequency of the activation signal, and a charge capacitor connected to the tag circuitry. In addition, the tag circuitry includes at least one switchable load impedance connected across the antenna resonant circuit, the tag circuitry includes a non-volatile memory containing full-duplex identification data and half-duplex identification data, the tag circuitry is configured to receive power from electric current induced in the inductive antenna by the periodic activation signal, the tag circuitry is configured to store electrical current induced in the inductive antenna by the activation signal on the charge capacitor, the tag circuitry includes at least one switchable load impedance connected across the antenna resonant circuit, the tag circuitry and the resonant antenna circuitry are configurable as an oscillator, the tag circuitry is configured so that the tag circuitry frequency shift key modulates an oscillator signal appearing at the resonant antenna circuit terminals with a sequence indicative of the half-duplex identification data using a switchable load impedance when the RF threshold detector detects that the amplitude of the potential difference induced across the terminals of the inductive antenna is below an half-duplex mode threshold, the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during alternating repetitions of the interrogation cycle when the RF threshold detector detects that the amplitude of the potential difference induced across the terminals of the inductive antenna is at least above the half-duplex mode threshold and is below an multiplex mode threshold, and the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during each repetition of the interrogation cycle when the RF threshold detector detects that the amplitude of the potential difference induced across the terminals of the inductive antenna is at least above the multiplex mode threshold.

In a further additional embodiment again, the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the multiple mode threshold and is below the multiplex enhanced mode threshold, and the tag circuitry is configured to utilize charge stored on the charge capacitor to increase the modulation index of at least a portion of the amplitude modulated activation signal when RF threshold detector detects that the amplitude of the potential difference induced across the terminals of the inductive antenna above a diplex mode threshold.

Another additional embodiment again includes two antenna terminals connected to tag circuitry, where the terminals are configured to connect to an inductive antenna. In addition, the tag circuitry includes a non-volatile memory, a resonant capacitor connected across the antenna terminals, at least one modulation impedance connected in parallel to the resonant capacitor and a transistor configured to that control current flow through the modulation impedance, a ringing oscillator configured to generate a potential difference across the antenna terminals in response to receipt of a trigger puke, and a configuration memory, where the configuration memory stores information concerning circuits within the tag circuitry that are active based upon the potential difference across the antenna terminals.

An embodiment of the method of the invention includes using a tag reader to separately encode the identification code as full-duplex identification data, and half-duplex identification data and to write the full-duplex identification data, and the half-duplex identification data to a radio frequency identification (RFID) tag, where the radio frequency identification tag has a resonant antenna circuit and is configured to respond to receipt of an interrogation cycle including an activation signal by amplitude modulating the activation signal with a sequence indicative of the full-duplex identification data using a switchable load impedance across the RFID tag resonant antenna circuit and transmitting a frequency shift keyed signal indicative of the half-duplex identification data using the switchable load impedance when the activation signal is absent;, activating the RFID tag reader by repeating the interrogation cycle, detecting the full-duplex identification data and the half-duplex identification data transmitted by the RFID tag using the tag reader, and decoding the identification code using the full-duplex identification data and the half-duplex identification data using the tag reader.

A further embodiment of the method of the invention includes the tag is configured to respond to repeated receipt of an activation signal by amplitude modulating the activation signal with a sequence indicative of the full-duplex identification data during a first interrogation cycle and transmitting a frequency shift keyed signal indicative of the half-duplex identification data during pauses in a second interrogation cycle.

In another embodiment of the method of the invention the tag is configured to respond to repeated receipt of an interrogation signal by amplitude modulating the activation signal with a sequence indicative of the full-duplex identification data during a portion of each interrogation cycle in which an activation signal is present and transmitting a frequency shift keyed signal indicative of the half-duplex identification data during a portion of each interrogation cycle in which the activation signal is absent.

BRIEF DESCRIPTION OF THE DRAWINGS

FIGS. 2b-1 through 2b-5 illustrate signal waveforms associated with the ISO FDX-B transponder modulation scheme.

FIGS. 2c-1 through 2c-4 illustrate signal waveforms associated with the ISO HDX transponder modulation scheme.

FIGS. 3a-3c illustrate signal frequency spectra associated with the activation signal and transponder transmit signals for FDX-B and HDX transponders.

FIGS. 4a-4d illustrate an ISO Standard 11785 interrogator's activation signal adaptive timing for idle, HDX, and FDX-B transponder detection.

FIG. 5 illustrates the functional block diagram of a combined HDX and FDX-B transponder in accordance with an embodiment of the present invention.

FIGS. 6a-6d illustrate waveforms associated with a HDX related ringing oscillator in activated in accordance with an embodiment of the invention.

DETAILED DESCRIPTION OF THE INVENTION

Turning now to the drawings, embodiments of combined HDX and FDX-B transponders and tag-integrated circuits that utilize a switchable load impedance to amplitude modulate a carrier and to transmit frequency modulated signals are shown. The combined HDX and FDX-B transponders are configurable to transmit in an HDX mode and/or in an FDX-B mode. The transponders can be configured to operate in only one mode. Alternatively, the transponders can be configured to operate in an HDX mode during one activation cycle and in an FDX-B mode during a subsequent activation cycle. In many embodiments, the transponders are able to operate in an HDX mode and an FDX-B mode during different portions of an activation cycle increasing the number of instances in which a tag reader receives the transponder's identification data. In a number of embodiments, the operating mode of the transponder is determined based upon the strength of the activation signal. In several embodiments, the ability to operate in various modes is provided by the inclusion of a load modulation circuit in the circuitry of the transponder. Various combined HDX and FDX-B transponders in accordance with embodiments of the invention are discussed below.

Combined HDX and FDX-B Transponders

Figure 1:
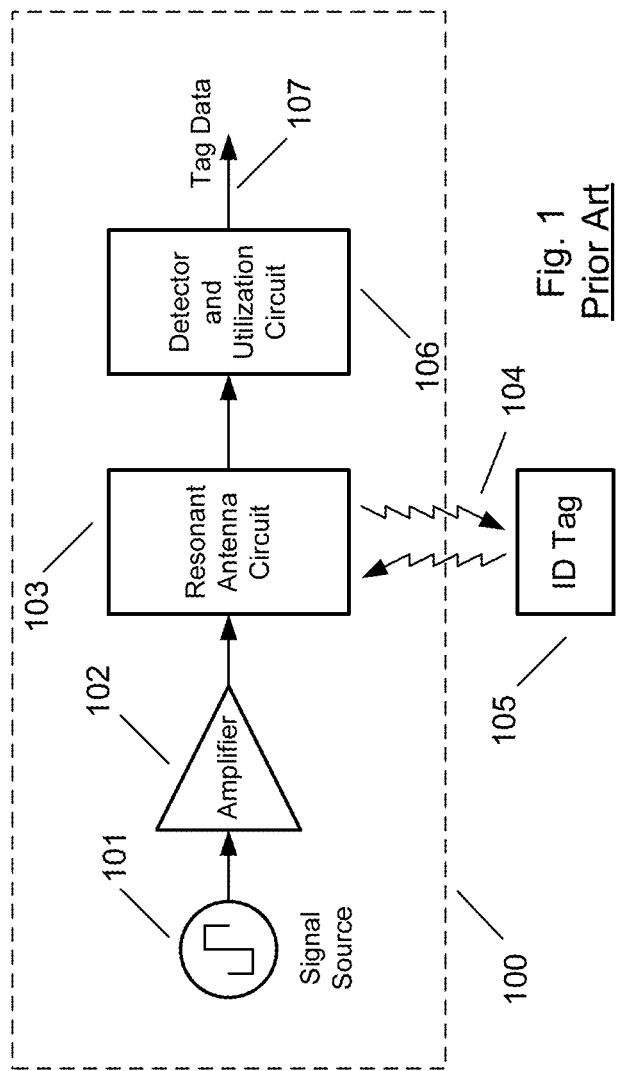
FIG. 1 illustrates the basic components and operation of a generic prior art passive radio frequency identification (RFID) system.
Figure 2A:
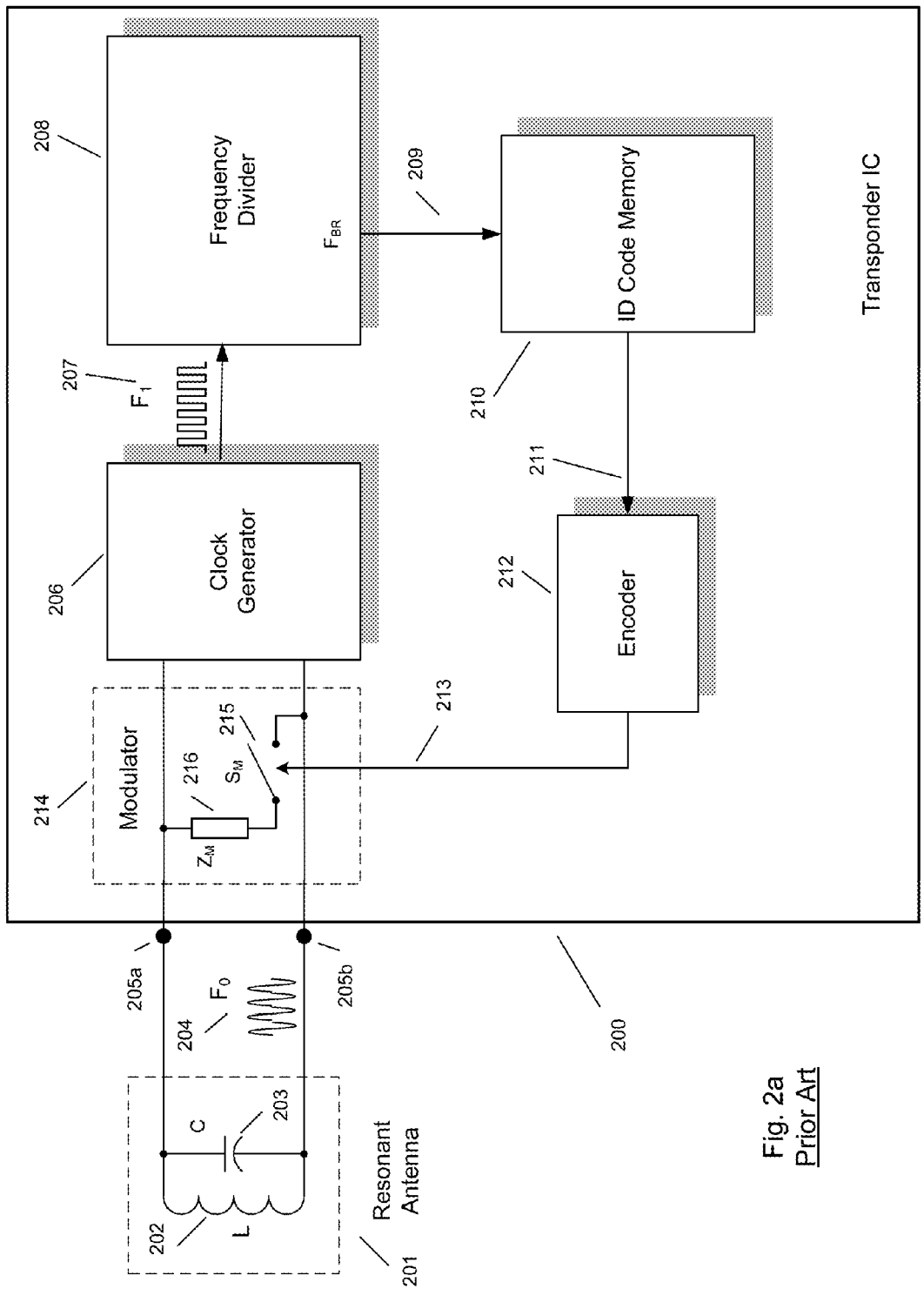
FIG. 2a illustrates a generic functional block diagram for a prior art RFID transponder.
Figure 2B:
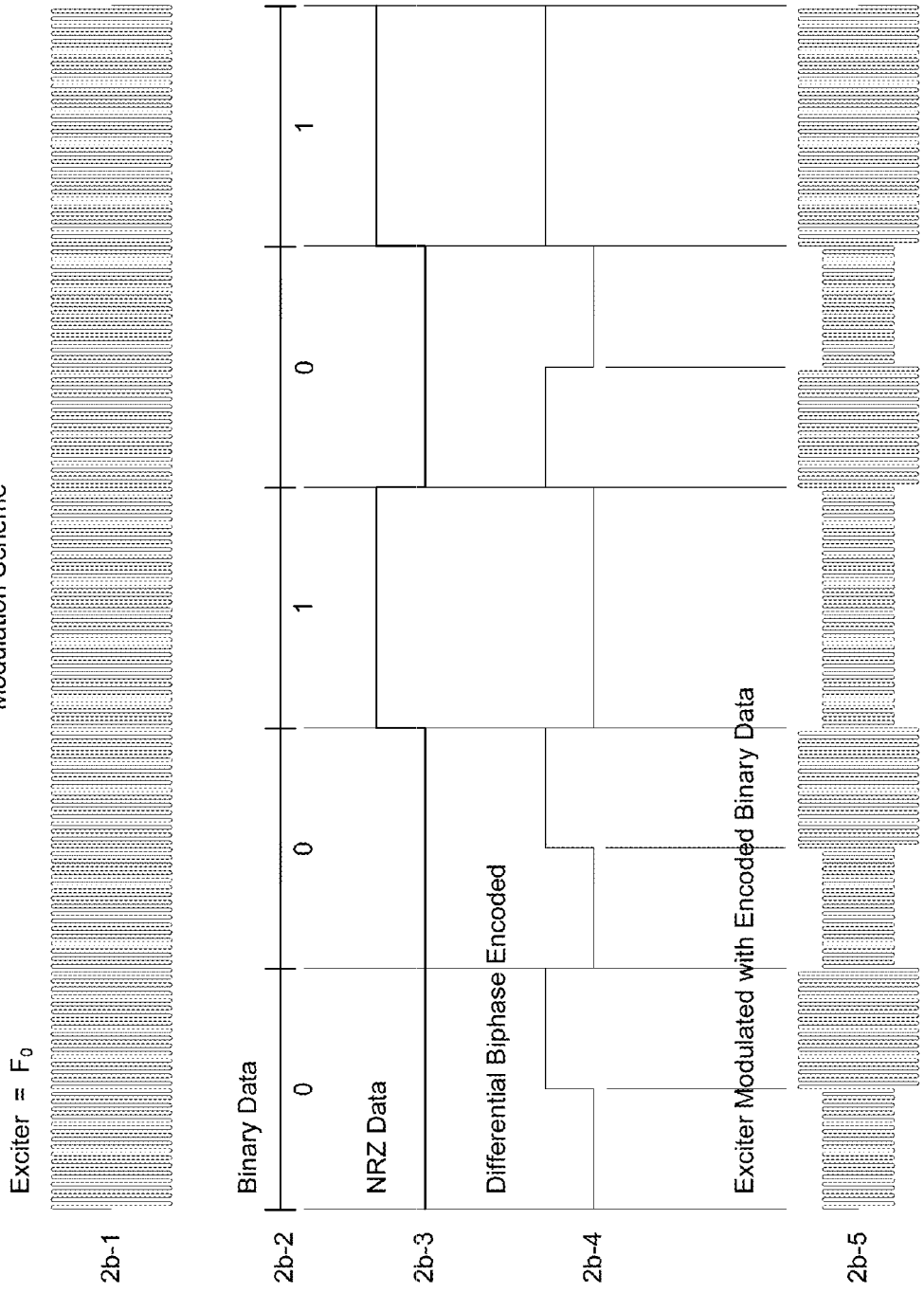
Figure 2C:
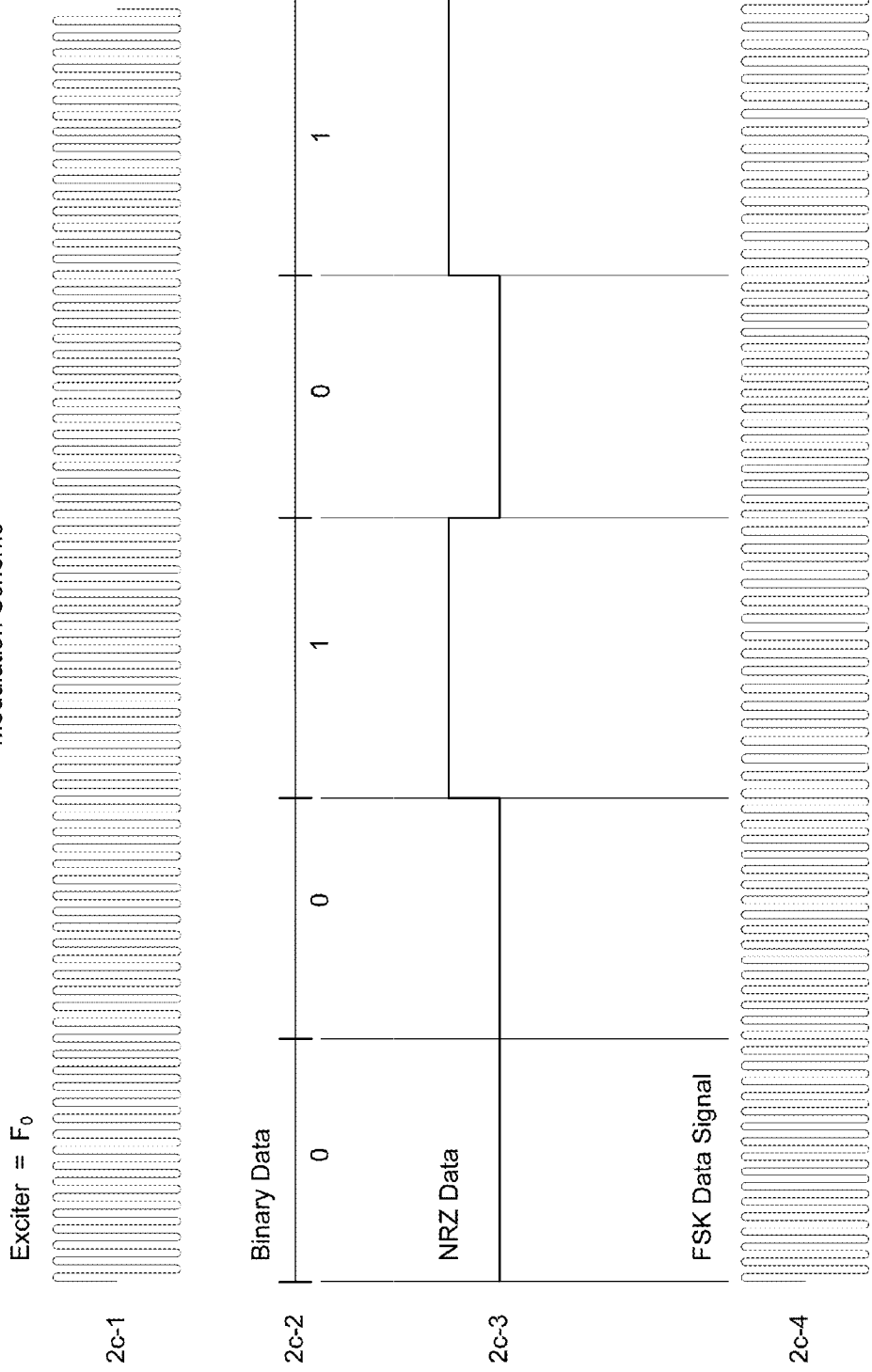
Figure 5:
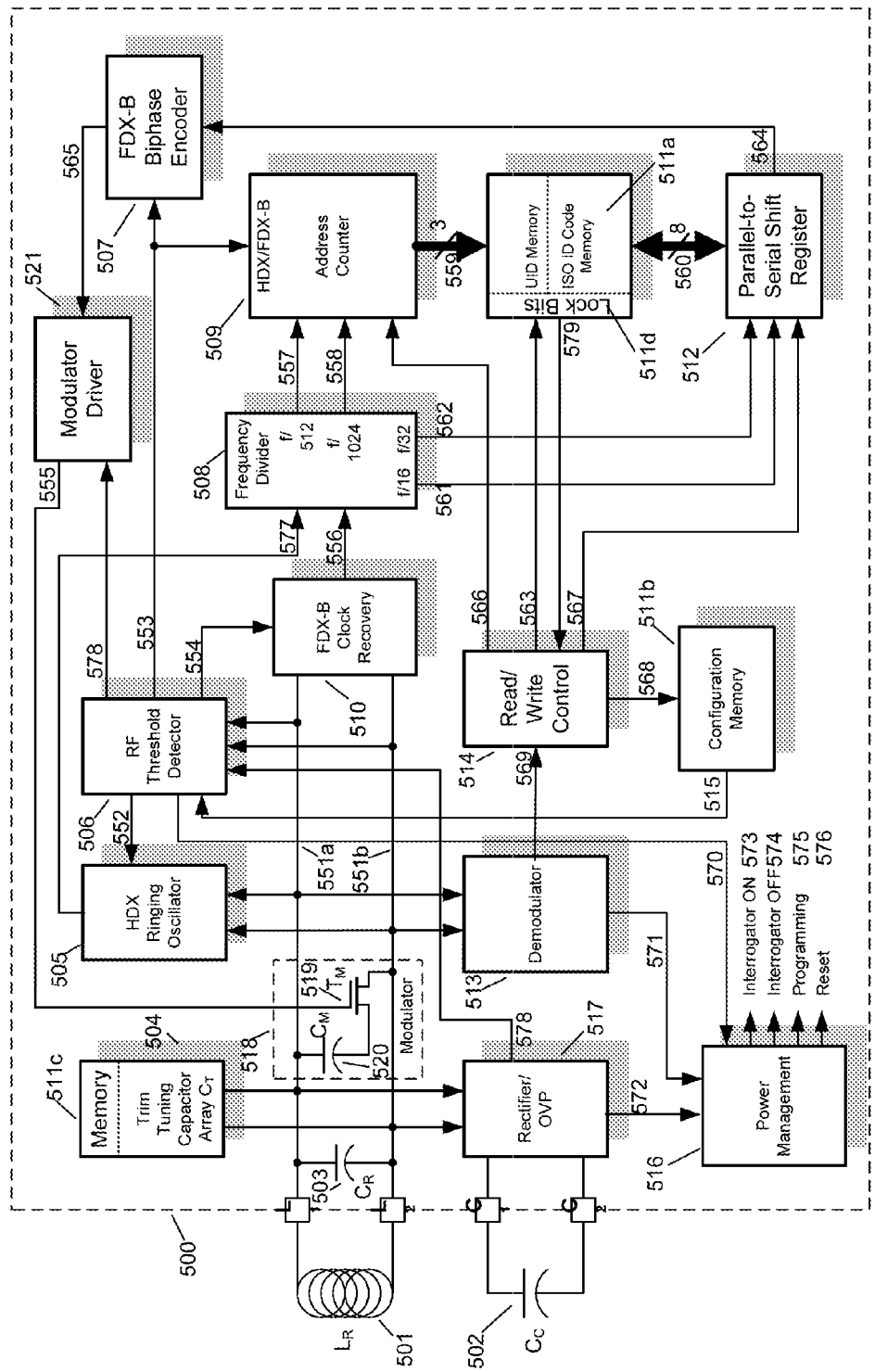

A functional block diagram of a transponder in accordance with an embodiment of the invention is illustrated in FIG. 5. The combined HDX and FDX-B transponder is a passive radio frequency identification device that is powered from an inductively coupled 134.2 KHz activation signal. In many embodiments, the combined HDX and FDX-B transponder is implemented using a single integrated circuit device (the "tag-IC"). The HDX/FDX-B "tag-IC" 500 is combined typically with at least two external components for operation, including an inductive antenna element $L_R$ 501, and an energy storing charge capacitor, $C_C$ 502. These two external components (501, 502) are electrically connected to the tag-IC 500 through four bonding pad terminals labeled $L_1, L_2, C_1,$ and $C_2$ on the tag-IC's substrate, but could share at least one connection. The tag-IC 500 contains an on-chip tuning capacitor $C_R$ 503 that resonates with the external antenna $L_R$ 501 at 134.2 KHz. The tag-IC 500 also contains a trim tuning capacitor array $C_T$ 504 used to fine tune the antenna resonant circuit. Alternately, the resonant capacitor $C_R$ 503 can be an external discrete component wired in parallel with the antenna $L_R$ 501.

The tag-IC 500 has a contact-less read/write memory capability that in a preferred embodiment of the invention is intended for use in a one-time-programmable (OTP) configuration. However, the invention may alternately include reprogrammable memory, or a combination of one-time programmable and reprogrammable memory. This memory is typically an EEPROM (Electrically Erasable Programmable Read Only Memory) type comprising at least 256 data bits for conformance with ISO 11784/11785. Additional memory bits may be included to enable storage of additional data including, but not limited to, bits to set the trim tuning of the antenna resonant circuit, bits to lock the memory once programmed, bits to record unique manufacturer related information, and bits to set tag-IC configuration and operating parameters. Typically, the total memory size would be 320 bits in a preferred embodiment, but could be larger if the application so warranted. Once programmed, the tuning, identification information, and configuration parameters are preferably made permanent and re-programming or alteration of the memory is inhibited. The invention can use alternate non-volatile memory technologies, such as ferro-electric random access memory (FeRAM), that are capable of providing EEPROM equivalent capability.

Functional Block Diagram

Prior to describing the operation of the tag-IC 500, it is instructive to describe the function of each of the block components shown and identified in FIG. 5. Although specific block components are shown in FIG. 5, these components can be implemented using combinatorial logic circuitry or could be combined with one or more other block components and/or performed by a microcontroller using stored program control and execution.

Antenna Coil $L_R$

External antenna coil component $L_R$ 501 is connected to the tag-IC through bonding pad terminals $L_1$ and $L_2$. $L_R$ forms a tuned circuit in conjunction with resonant capacitor $C_R$ 503 and trim tuning capacitor array $C_T$ (504, 511c) to receive the 134.2 KHz activation signal from an interrogator. The external antenna coil component $L_R$ 501 is also the magnetic field radiating element that transmits the tag-IC's HDX and FDX-B data signals to the interrogator, and that establishes (along with $C_R$, $C_T$, and $C_M$) the frequency of the HDX ringing oscillator.

Charge Capacitor $C_C$

Charge capacitor $C_C$ 502 connects to the tag-IC through bonding pad terminals $C_1$ and $C_2$, and accumulates charge from the received activation signal, which is subsequently used to power the HDX transmit function and to facilitate powering the FDX-B function.

Resonant Capacitor $C_R$

The resonant tuning capacitor $C_R$ 503 has a value selected for resonance with antenna coil $L_R$ 501 at 134.2 KHz.

Trim Tuning Capacitor Array $C_T$

The trim capacitor array $C_T$ (504, 511c) provides small value capacitors in parallel with the resonant circuit $L_R/C_R$ and fine-tunes the resonant frequency to within the desired tolerance of 134.2 KHz. Typically, the trim capacitor array includes several capacitors having binary weighted values, and are added to the resonant circuit using programmed memory bits for control. The memory bits 511c may be part of a larger memory comprising the configuration memory 511b and the UID/ISO ID code memory 511a.

Modulator

In a number of embodiments of the invention, the modulator 518 includes on-chip modulation capacitor $C_M$ and transistor switch $T_M$ that together alter the tuning of the resonant circuit from its $L_R C_R$=134.2 KHz to $L_R(C_R+C_M)$=124.2 KHz for HDX FSK modulation and provides amplitude modulation for FDX-B, by altering the Q of the resonant antenna circuit.

Rectifier and Over-Voltage Protector (OVP)

The tag-IC includes a rectification function that converts the 134.2 KHz activation signal to DC for the purpose of charging the charge capacitor $C_C$ 502, and for providing power to the tag-IC circuitry. The over-voltage protector (OVP) device 517 protects the tag-IC device from high activation signal voltages that would otherwise exceed the operating voltage maximum and irreversibly damage the tag-IC. The output signal 578 conveys the state of the charge capacitor $C_C$ 502 to other tag-IC circuit functions.

Power Management

The power management circuit 516 controls the application of power resources to all portions of the tag-IC in a manner that conserves energy and optimizes tag operation. In addition, the power management circuit controls the reset function, which initializes all relevant circuits to their respective proper states. The power management circuit provides at least three power outputs that regulate which tag-IC circuitry is powered during (a) the interrogator on/charge capacitor $C_C$ 502 charging interval/FDX-B transmitting interval, (b) the interrogator off/HDX data transmit interval, and (c) the memory contact-less programming interval.

RF Threshold Detector

The RF threshold detector 506 provides multiple tasks depending on the state of the tag-IC, by monitoring the voltage across the terminals of the resonant antenna circuit $L_R$ 501. The RF threshold detector:

(a) senses when the activation signal has sufficient amplitude for tag-IC operation, which includes (i) charging the charge capacitor $C_C$ 502, (ii) enabling FDX-B signal transmission, and (iii) memory programming;

(b) senses the low activation signal condition and limits tag-IC operation to one of either the HDX mode or the FDX-B mode ("monoplex"), or the alternate cycle mode ("multiplex");

(c) senses when the activation signal is of sufficient amplitude to support both HDX and FDX-B operations ("diplex");

(d) senses the termination of the activation signal, for example by determining when the instantaneous peak level of the activation signal has decreased by nominally 3 dB relative to a time averaged level of the activation signal, and upon sensing this event switches the tag-IC from the FDX-B transmit/charge capacitor $C_C$ 502 charge state to the HDX transmit state (in other embodiments a threshold other than 3 dB can be used);

(e) senses the instantaneous amplitude of the ringing oscillator signal that appears across the antenna coil $L_R$ 501, and re-triggers the oscillator as is necessary to maintain its oscillation;

(f) senses when the activation signal is of sufficient strength to support enhanced FDX-B modulation;

(g) senses when the oscillator amplitude decays beneath a specified instantaneous peak signal level, and signals the power management circuitry and other functions to hall operation.

HDX Ringing Oscillator

The tag-IC requires its own oscillator source for creating an HDX FSK modulated transmit signal. A ringing oscillator 505 uses a relatively high-Q resonant circuit (in this case $L_R$ and $C_R$, plus $C_T$ and $C_M$) that is triggered with a narrow pulse every n cycles of the oscillator's frequency. This narrow pulse causes the resonant circuit to produce a ringing oscillation that lasts several cycles, depending on the Q of the resonant circuit. The output of the ringing oscillator produces an FSK signal that transmits the tag-IC's HDX memory contents.

The HDX communication protocol uses two FSK frequencies, 134.2 KHz and 124.2 KHz, to convey the bit values 0 and 1, respectively. Each data bit in the ID Code Memory is conveyed with 16 cycles of the corresponding frequency. A bit value 0 causes the ringing oscillator 505 to produce 16 cycles of the frequency 134.2 KHz, and the bit value 1 causes the oscillator to produce 16 cycles of 124.2 KHz.

UID/ISO ID Code Memory

The memory 511a includes at least 128 data bits each for the HDX and FDX-B identification codes specified by ISO 11784 and 11785 (i.e. at least 256 bits). In a preferred embodiment, the UID/ISO ID code memory 511a is part of a larger memory structure that can include configuration memory 511b, trim tuning capacitor memory 511c, and/or lock bit memory 511d. The memory may also contain additional bits for storing the IC manufacturer's unique identification number (UID). The memory may be organized as 8 pages of 32 bits each (32×8=256), or as a larger structure, such as 10 pages of 32 bits each (32×10=320) if a UID number and other memory functions are implemented. In response to an unmodulated interrogation signal, only the 256 ISO HDX/FDX-B identification data bits 511*a* are transmitted.

Configuration Memory

This Configuration Memory 511*b* contains programmable bits that govern the operating characteristics of the tag-IC. Typical of such characteristics are (i) Mode (HDX, FDX-B, or HDX/FDX-B); (ii) low activation signal mode (monoplex or multiplex); monoplex priority (HDX or FDX-B); delayed/enhanced FDX-B modulation. Various operating modes of a tag-IC in accordance with embodiments of the invention are discussed further below.

Lock Bit Memory

The lock bits contained in the lock bit memory 511*d* are used to disable permanently further programming or reprogramming of a corresponding portion of memory. In a preferred embodiment, the lock bits are allocated to each 32 bit segment of memory. Consequently, the memory can be programmed and locked in stages during various manufacturing phases. Although in other embodiments, any of a variety of techniques can be used to lock data stored in the memory of the combination HDX and FDX-B transponder.

Address Counter

The address counter 509 provides the interface between clocking pukes produced by the frequency divider and the memory. Assuming that the ISO ID code memory 511*a* is the minimal 8 pages×32 bits/byte arrangement (256 bits total), the address counter 509 produces a three bit output that sequences through 8 possible binary patterns from 000 through 111. This bit pattern is applied to the ID code memory 511*a*, and the corresponding data page (1 through 8) appears at the memory data output, where it is presented to the parallel to serial shift register 512. The address counter 509 is also capable of accessing other portions of the memory for programming configuration data, the UID, and the trim capacitors (504, 511*c*). In this latter configuration, the address counter produces a four bit output, and the memory would include additional 32 bit pages, for example 10 pages. The address counter 509 would then sequence through 10 possible binary patterns from 0000 through 1001, and the memory would include at least 10 pages×32 bits for a total of 320 bits.

Parallel to Serial Shift Register

Data appears at the shift register's 512 parallel input from the memory data output as a 32 bit word. The frequency divider provides synchronized clocking pukes to the address counter 509 and Shift Register 512 in a 32-to-1 ratio such that the Shift Register 512 clocks out serially 32 bits for each 32 bit word that is transferred in. The shift register 512 operates in the reverse mode as a serial to parallel converter for programming bits into the memory, as instructed by the read/write control circuit 514.

FDX-B Clock Recovery

The 134.2 KHz sinusoidal activation signal is applied to the clock recovery circuit 510, which derives a 134.2 KHz digital compatible signal for clocking the frequency divider 508.

Demodulator

The demodulator 513 detects pulse modulation of the activation signal and extracts commands and data that are embedded therein. The demodulator 512 provides data to be programmed and controlling commands to the read/write control 514, and enables the power management circuit 516 to activate associated portions of the tag-IC that need to be powered for memory programming.

Read/Write Control

Commands and data are received from the demodulator 513, and are acted on accordingly. Portions of memory are programmed with received data, and portions of memory are accessed for transmission to the interrogator. When lock bits are programmed in the memory, the read/write control 514 inhibits programming of the corresponding memory zone.

FDX-B Biphase Encoder

Data bits in the FDX-B portion of memory appear at the biphase encoder 507 input in NRZ (non-return to zero) coding and are translated into biphase encoded data. Alternately, data could be pre-encoded in the memory in biphase format, thus eliminating the requirement for this functional block. During the HDX transmission interval, the biphase encoder 507 is disabled so that data flows through it without change.

Modulator Driver

ID code data appearing at the modulator driver 521 input is used to switch transistor $T_M$ on and off for HDX transmission. FDX-B amplitude modulation may require less amplitude change than provided by modulation capacitor $C_M$ 520, and in this case transistor $T_M$ 519 is driven only partially on so as to create a finite resistance. In an alternate configuration, more than a single modulator can be utilized, and the modulator driver drives two switches and modulation impedances, one each for HDX and FDX-B.

FDX-B Transmission

Assuming that the tag-IC device has already been programmed with tuning and identification data, reading data from the tag proceeds according to the following sequence, referring to FIG. 5.

Inductor $L_R$ 501 is resonant with capacitor $C_R$ 503 at 134.2 KHz, which is the activation signal frequency emitted by an ISO interrogator. Resonant circuit $L_R/C_R$ (501, 503) captures the interrogation signal which appears as a sinusoidal waveform (e.g., AC voltage) across these parallel wired components 551*a*, 551*b*. Modulation transistor switch $T_M$ 519 is OFF, and no modulating impedance is connected in parallel with resonant circuit $L_R/C_R$ (501, 503).

Rectifier/OVP circuit 517 is wired in parallel with resonant circuit $L_R/C_R$ (501, 503), and converts this AC activation signal voltage to a DC voltage suitable for providing operating power to the tag-IC's circuitry 500. The OVP (over voltage protection) clamps the DC voltage at a predetermined maximum value so that excessively strong activation signals do not damage the tag-IC's circuitry 500.

The Rectifier/OVP circuit's DC output voltage is supplied to power management circuit 516, which selectively powers only those portions of the tag-IC's circuitry 500 that are relevant for FDX-B mode operation. Interrogator ON output 573 provides DC operating voltage to the functional blocks in FIG. 5 when enabled by RF threshold detector 509 via a control signal (570). Reset output 576 ensures that relevant logic circuitry is appropriately initialized so as to ensure correct operation of the logic circuitry.

The RF threshold detector 509 is connected across the tag-IC's resonant circuit $L_R/C_R$ (501, 503), and determines when the AC voltage is greater than a predetermined level that is known as sufficient to support FDX-B operation. When this level has been determined to exist, the RF Threshold Detector 509 enables the power management circuit 516 and the FDX-B clock recovery circuit 510 by means of control signals (570, 554) that in turn enable the tag-IC 500 to operate in the FDX-B mode. Such threshold detection reduces the likelihood that the tag-IC will operate abnormally and produce erroneous identification information. The power management circuit reset output (576) initializes the frequency divider 508, address counter 509, and biphase encoder 507 to ensure digital logic is correctly sequenced.

The FDX-B Clock Recovery circuit 510 is connected across the resonant circuit $L_R/C_R$ (501, 503) and receives the AC voltage signal as an input, and extracts a 134.2 KHz clock signal that is compatible with application to digital timing circuits. Such a signal is conventionally a square wave, although various duty cycle pulse signals may be equally acceptable for use. The FDX-B clock recovery output signal (556) is applied to the frequency divider circuit 508.

The frequency divider 508 is configured to work collaboratively with the address counter 509, memory (511a) and parallel-to-serial shift register 512 to access identification code data for application to modulation related circuitry including the FDX-B biphase encoder 507, modulation driver 521, and modulator 518. Although a specific architecture is shown in FIG. 5, other structures can be utilized that satisfy the requirements of a specific application in accordance with embodiments of the invention.

In the preferred embodiment illustrated in FIG. 5, the frequency divider 508 produces two digital clock signals derived from the 134.2 KHz input signals, the frequency divider 508 being a 10-stage binary counter having outputs at $2^4$ (f/16), $2^5$ (f/32), $2^9$ (f/512), and $2^{10}$ (f/1024). For FDX-B, the outputs f/32 and f/1024 are used, which are approximately 4194 Hz and 131 Hz respectively when f=134.2 KHz, and have a ratio of 32 to 1. In the architecture illustrated in FIG. 5, the memory 511a stores the 128 bits of FDX-B identification code organized as 4 words of 32 bits each.

Figure 7A:
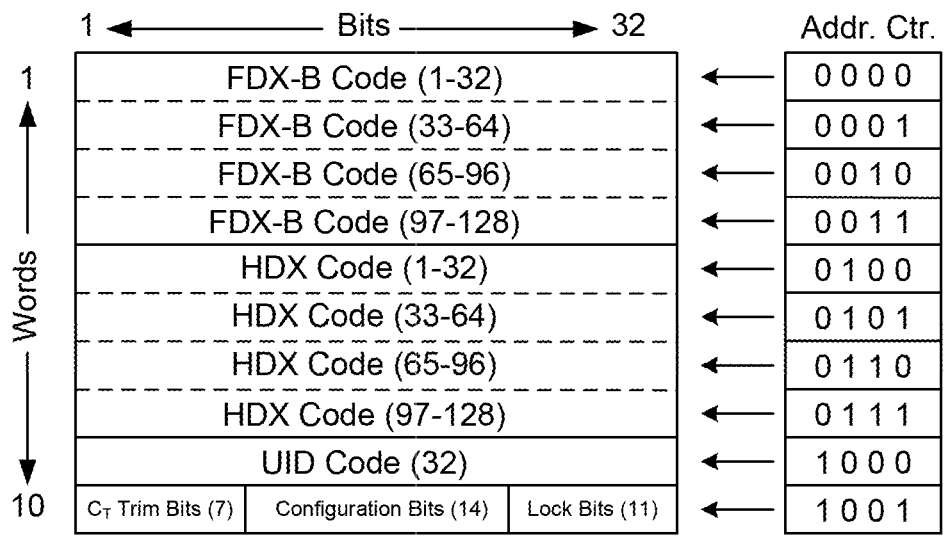
FIG. 7a illustrates organization of FDX-B and HDX code words in memory of a combination HDX/FDX-B transponder in accordance with an embodiment of the invention.

FIG. 7a illustrates a memory organization map can be utilized in a tag-IC in accordance with embodiments of the invention in which there are 10 words of 32 bits each (320 bits total). Words 1 through 4 of 32 bits each include the 128 bits of the FDX-B code, words 5 through 8 of 32 bits each include the 128 bits of the HDX code, word 9 is the 32 bit UID code, and word 10 is divided into trim tuning capacitor $C_T$ bits (7), configuration bits (14) and lock bits (11). The Address Counter 509 includes a 4-bit counter whose output can cycle between 0000 and 1001, but for FDX-B, cycles between 0000 and 0011.

The frequency divider's f/1024 output (558) is applied to address counter 509 and its f/32 output 562 is applied to the parallel-to-serial shift register 512. The RF threshold detector output 553 provides an indication to the address counter 509 that the tag-IC 500 is in the FDX-B operational state, thus causing the address counter 509 to cycle through the address pattern 0000, 0001, 0010, 0011, and accessing the Memory's 511a words 1 through 4 cyclically.

Each time the address counter 509 advances, 32 bits of memory are presented in parallel (560) to the input of parallel-to-serial shift register 512.

Read/write control circuit's outputs (563, 566, and 567) during the FDX-B mode are held in default states where an output 563 places the memory 511a in the read state, output 566 restricts address counter's operation range from memory 511a pages 9 and 10, and output 567 keeps the shift register 512 in the parallel-to-serial conversion mode.

Synchronous with the address counter 509 clocking, the parallel-to-serial shift register 512 is clocked at the rate f/32, or 32 times faster than the address counter 509. Thus, 32 bits of the memory 511a are input to shift register 512, and the f/32 signal 562 shifts all 32 bits out in serial fashion at 564 before the next 32 bits are input to the Shift Register in the same parallel manner. In this fashion, all 128 FDX-B code bits contained in the memory words 1 through 4 are cyclically shifted out contiguously at output 564.

The RF threshold detector 506 also enables the FDX-B biphase encoder 507 by means of control line 553 so that the serial data input (564) is converted from NRZ (non return to zero) encoding to biphase encoding, as illustrated in FIGS. 2b-2, 2b-3, and 2b-4. The biphase encoder output (565) is applied to the modulator driver 521, whose output (555) is in turn applied to the modulator 518, thus causing the passive load $C_M$ 520 to be bridged across resonant circuit $L_R/C_R$ (501, 503) (in accordance with the biphase encoded FDX-B code and inducing an amplitude modulation on the activation signal as illustrated in FIG. 2-5).

As will be described further in a later section, FDX-B transmission can occur in an enhanced modulation mode, which exploits the presence of the charge capacitor $C_C$ 502. In this enhanced mode, determined from the configuration set in configuration memory 511b, the tag-IC accumulates charge in charge capacitor $C_C$ 502 during a first portion of the activation signal on interval. During a second portion of the activation signal on interval, this accumulated charge provides power via power management circuit 516 to FDX-B related circuits in the tag-IC 500, thus displacing the power normally drawn instantaneously from the signal appearing across the antenna coil 501. Consequently, modulation driver 521 asserts via control line 555 a signal causing a greater modulation depth via switch $T_M$ 519 and modulation impedance $C_M$ 520. This increased modulation depth, or modulation index, results in a modulated signal of greater amplitude and is more easily detectable by the interrogator.

HDX Transmission

Assuming again that the tag-IC device has already been programmed with tuning and identification data, reading data from the tag proceeds according to the following sequence in reference to FIG. 5.

The inductor $L_R$ 501 is resonant with the capacitor $C_R$ 503 at 134.2 KHz, which is the activation signal frequency emitted by an ISO interrogator. The resonant circuit $L_R/C_R$ captures the interrogation signal which appears as a sinusoidal waveform (e.g., AC voltage) across these parallel wired components (551a, 551b). The modulation transistor switch $T_M$ 519 is OFF, and no modulating impedance is connected in parallel with resonant circuit $L_R/C_R$.

The rectifier/OVP circuit 517 is wired in parallel with the resonant circuit, and converts this AC activation signal voltage to a DC voltage suitable of providing operating power to part of the tag-IC's circuitry 500 that is active during the activation signal ON interval. The Rectifier/OVP 517 clamps the DC voltage at a predetermined maximum value so that excessively strong activation signals do not damage the tag-IC's circuitry 500. The rectifier/OVP circuit 517 is connected to the charge capacitor $C_C$ 502, which accumulates charge, thus developing a voltage potential across its terminals $C_1$ and $C_2$.

The Rectifier/OVP circuit's DC output voltage (572) is supplied to the power management circuit 516, which selectively powers only those portions of the tag-IC's circuitry 500 that are relevant for HDX mode operation. The interrogator ON output (573) provides DC operating voltage to the RF threshold detector 509, which in turn prevents the tag-IC from commencing HDX signal transmission until sufficient charge has been accumulated on the charge capacitor $C_C$ 502.

The RF threshold detector 506 detects the presence of the AC activation signal, and asserts the disable control signal (552) on the HDX ringing oscillator 505, which prevents the HDX code transmission from occurring spontaneously while the activation signal is present. After the activation signal has been present long enough that the charge capacitor $C_C$ 502 has accumulated sufficient charge to operate the tag-IC in the HDX mode, the rectifier/OVP circuit 517, which includes charge capacitor $C_C$ level sensing circuitry, signals the RF threshold detector 506 via a control line (578).

The RF threshold detector 506 continues to disable the HDX ringing oscillator 505 for as long as the AC activation signal remains present at a substantially constant level. The RF threshold detector 506 senses a nominal 3 dB decrease (or other appropriate decrease) in the activation signal level within an interval of approximately 0.2 milliseconds, as an indication that the activation signal has been switched OFF by the interrogator. Upon sensing this event, the HDX ringing oscillator 505 is enabled, the charge capacitor $C_C$ 502 provides power through the rectifier/OVP 517 to the power management circuit 516, and the interrogator OFF output (574) is enable by the RF threshold detector 506 via a control signal (570) such that all relevant HDX code transmission circuitry is powered. The power management circuit Reset output (576) initializes the frequency divider 508 and address counter 509 to ensure digital logic is correctly sequenced.

Referring to FIG. 5 and FIG. 6a, the resonant circuit comprising antenna $L_R$ 501 and capacitor $C_R$ 503 continues to resonate at approximately 134.2 KHz after cessation of the interrogator's activation signal (600), exhibiting an exponentially decaying sinusoid waveform at tag-IC terminals $L_1$ and $L_2$ (601). The exponentially decaying sinusoid waveform signal is sensed by the RF threshold detector 506 across the lines 551a, and 551b, as shown in FIG. 6b. When this waveform 602 decays 603 to a predetermined level 604, the RF Threshold Detector 506 pulses the HDX ringing oscillator 505 with a short pulse (see for example the pulse 605 shown in FIG. 6c) of predetermined amplitude and duration by means of output 552, so as to re-trigger the oscillator 505 and maintain its operation at 134.2 KHz (FIG. 6a). This re-triggering reoccurs every time the signal level across the lines 551a, 551b decays to this predetermined level, thus keeping the oscillator 505 operating.

The HDX ringing oscillator output (577) has a digital wave shape that is typically square, but may be pulse shaped (FIG. 6d), and is applied to the frequency divider circuit 508. The frequency divider 508 provides two outputs comprising f/16 (561) and f/512 (557) that are used to access HDX code data stored in the memory 511a. For a HDX ringing oscillator output (577) frequency equal to 134.2 KHz, f/16 (561) equals approximately 8387 Hz and f/512 (557) equals approximately 262 Hz, and are related by a ratio of 32 to 1. The RF threshold detector output control signal (553) sets the address counter 509 for words 5 through 8 (as shown in FIG. 7a), and disables the biphase encoder 507 such that binary data input (564) passes through to the output of the biphase encoder (565) without any waveform revision.

The frequency divider 508 outputs f/16 (561) and f/512 (557) to provide access to HDX code data stored in the memory 511a in a manner similar to that previously described for FDX-B. The address counter 509 includes a 4-bit counter whose output cycles between 0100 and 0111, for accessing HDX data. The frequency divider's f/512 output (557) is applied to the address counter 509 and its f/16 output (561) is applied to the parallel-to-serial shift register 512. The address counter 509 thus cycles through the address pattern 0100, 0101, 0110, 0111, accessing the memory's words 5 through 8. Upon reaching 0111, the address counter 509 stops advancing so that the HDX ID code is transmitted only one time.

For each address counter state 0100 through 0111, 32 bits of memory (511a) are presented in parallel to the input of the parallel-to-serial shift register 512. The read/write control circuit's outputs (563, 566, and 567) during the HDX mode are held in default states where an output (563) places the memory 511a in the read state, another output (566) restricts the address counter's 509 operation range from memory pages 9 and 10, and a further output (567) keeps the shift register 512 in the parallel-to-serial conversion mode.

Synchronous with the address counter 509 clocking, the parallel-to-serial shift register 512 is clocked at the rate f/16, or 32 times faster than the address counter 509. Thus, 32 bits of the memory 511a are input to the shift register 512, and the f/16 signal (561) shifts all 32 bits out in serial fashion from the serial output (564) before the next 32 bits are input to the Shift Register in the same parallel manner. In this fashion, all 128 HDX code bits contained in the memory words 5 through 8 are shifted out contiguously at output 564, and pass through the biphase detector 507 without alteration, so that the signal output (565) remains NRZ encoded HDX data.

As each data bit is shifted out of shift register 512, the modulator driver output (555) drives the modulator transistor switch $T_M$ 519 with the corresponding data value. Whenever the HDX data 555 has a bit value equal to 0, the switch $T_M$ 519 remains open. Thus, the modulation capacitor $C_M$ 520 is not connected across the resonant circuit $L_R/C_R$ (501, 503), and the HDX ringing oscillator 505 continues operating at the 134.2 KHz frequency. Whenever the HDX data (555) has a bit value equal to 1, the switch $T_M$ 519 closes, thus connecting modulation capacitor $C_M$ 520 across the resonant circuit $L_R/C_R$ (501, 503), causing the HDX ringing oscillator 505 to alter its oscillation frequency to 124.2 KHz. The RF threshold detector output (578) controls the modulator driver output (555) such that transistor switch $T_M$ 519 turns fully ON.

When the HDX ringing oscillator 505 changes its oscillation frequency to 124.2 KHz, the frequency divider outputs f/16 (561) and f/512 (557) change to approximately 7762 Hz and 242 Hz respectively. Consequently, an HDX 1-value data bit in the memory 511a has a slightly longer duration than an HDX 0-value data bit. However, all data bits have a duration equal to 16 cycles of the instantaneous frequency of the HDX ringing oscillator 505. In this manner, the tag-IC produces frequency shift keyed (FSK) modulation comprising 134.2 KHz (data value=0) and 124.2 KHz (data value=1), as is illustrated in FIGS. 2c-2 through 2c-4.

Combined FDX-B/HDX Transmission

The modes of FDX-B and HDX signal transmission as described thus far can be invoked by means of the tag-IC's configuration memory 511b to operate singularly such that the tag-IC emulates an FDX-B only tag or an HDX only tag. The tag-IC is also capable of combined FDX-B/HDX ("diplex") operation, wherein FDX-B transmission and HDX transmission occur sequentially as just described, during each interrogation cycle.

However, during the activation signal ON interval, the activation signal must be used for charging the charge capacitor $C_C$ 502 and for providing an AC signal carrier for amplitude modulation use by the FDX-B data. Obviously, the activation signal can support both functions only when its signal strength has sufficient magnitude to do so. If the tag-IC's operation was to be inhibited until such a sufficiently strong activation signal existed to power both FDX-B and HDX, the reading distance performance of the tag-IC would diminish from that exhibited when configured singularly as an FDX-B only or an HDX only tag. Consequently, the tag-IC's operation in the combined FDX-B/HDX mode has to be managed differently when the activation signal strength is marginal. The configuration memory 511b and RF threshold detector 509 jointly determine and control how combined FDX-B/HDX operation is managed.

When the activation signal is insufficient to power both FDX-B and HDX transmissions, the tag-IC reverts to a transitory alternate transmission mode until the activation signal strength changes. Several alternate transitory modes are available and are selectable by means of the configuration memory 511b. While in a transitory mode, the tag-IC transmits only one of either FDX-B or HDX for each interrogation cycle. Once the activation signal strength is sufficiently large, the tag-IC automatically advances to the diplex mode, but reverts back to the transitory mode if the activation signal strength decreases again.

By means of the configuration memory, the tag-IC's operation at marginal activation signal magnitudes can be specified. In one embodiment, as depicted in FIG. 7a, the configuration memory 511b has 14 bits allocated for this purpose. As an example of how these bits could be assigned is the following scheme that employs 4 bits:

| Configuration Memory | Operating Mode |
|---|---|
| 0000 | Singular FDX-B Only Transmission |
| 0001 | Singular FDX-B Only Transmission (Delay/Enhance) |
| 0010 | Singular HDX Only Transmission |
| 0011 | FDX-B Monoplex Transmission |
| 0100 | FDX-B Monoplex Transmission (Delay/Enhance) |
| 0101 | HDX Monoplex Transmission |
| 0110 | FDX-B/HDX Multiplex Transmission |
| 0111 | FDX-B/HDX Multiplex Transmission (Delay/Enhance) |
| 1000 | FDX-B/HDX Diplex Transmission |
| 1001 | FDX-B/HDX Diplex Transmission (Delay/Enhance) |

The transitory transmission modes include three fundamental states: (a) FDX-B Monoplex, in which FDX-B only is transmitted during each interrogation cycle; (b) HDX Monoplex, in which HDX only is transmitted during each interrogation cycle; and (c) FDX-B/HDX Multiplex, in which FDX-B and HDX are alternately transmitted during each interrogation cycle.

In addition, for modes in which FDX-B transmission occurs, transmission can proceed immediately, or FDX-B can be delayed, allowing the Charge Capacitor $C_C$ to accumulate energy that can be used subsequently to transmit FDX-B with an enhanced signal strength, thus improving the reading distance of FDX-B, but reducing the transmit repetition rate.

Transmission States

Figure 8:
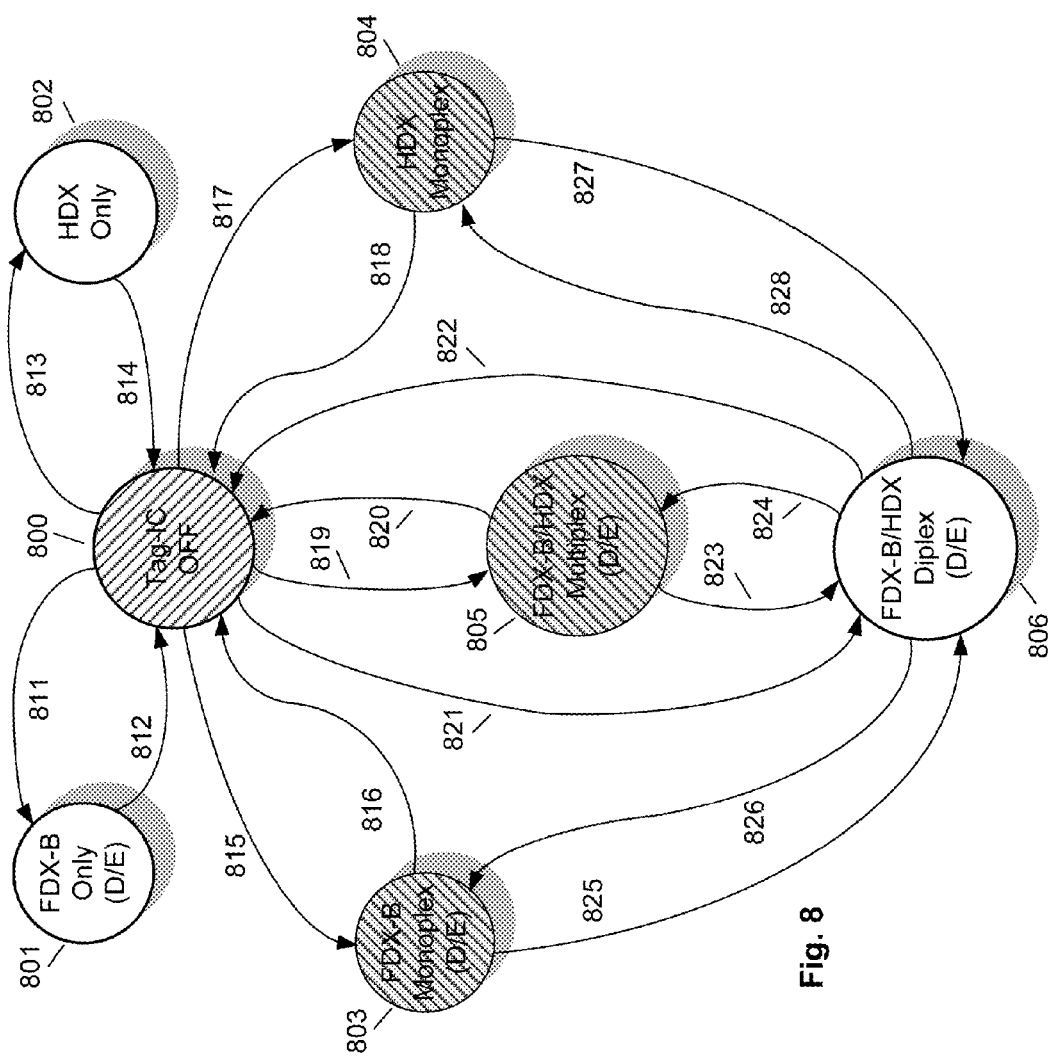
FIG. 8 is a state diagram that illustrates transmission modes of a combination HDX/FDX-B transponder in accordance with an embodiment of the present invention.

The following include possible transitory transmission states for a tag-IC in accordance with embodiments of the invention, and refer to FIG. 8, which illustrates a state diagram. The transmission modes are represented by the state diagram circles, while the connecting lines represent changes in activation signal level Singular FDX-B Only Transmission The Singular FDX-B Only Transmission mode 801 configures the tag-IC for FDX-B transmission exclusively. No HDX signal is ever transmitted. From the OFF state (800), FDX-B operation commences when the activation signal level is sufficient to support this mode (811). When the activation signal becomes insufficient to support FDX-B operation, the tag-IC returns to an OFF state (812).

Singular FDX-B Only Transmission (Delay/Enhance)

Singular FDX-B Only Transmission (Delay/Enhance) mode 801 is similar to the Singular FDX-B Only Transmission mode described immediately above, except that FDX-B transmission does not commence immediately upon there being sufficient power (811). Rather, power is accumulated in a charge capacitor $C_C$ during a first interval. Prior to the end of the 50 msec activation signal ON period, the FDX-B signal commences transmission, thereby causing the interrogator to extend its activation signal ON period in accordance with the interrogator's operation that was previously described herein in relationship to FIG. 4. The stored charge in charge capacitor $C_C$ is used to power the tag-IC internal circuitry, thus displacing the power normally drawn instantaneously from the activation signal, and allowing an increase in modulation, thus providing an improvement in FDX-B reading distance. When the interrogator has successfully read the FDX-B tag, or after the activation signal has been present for 100 msec, the interrogator turns the activation signal OFF, thus halting FDX-B operation (812). When the activation signal is sufficiently large, the delay is eliminated while enhanced FDX-B transmission continues.

Singular HDX Only Transmission

Singular HDX Only Transmission mode 802 configures the tag-IC for HDX transmission exclusively. No FDX-B signal is ever transmitted. From the OFF state 800, HDX operation commences when the activation signal level is sufficient to support this mode 813. When the activation signal becomes insufficient to support HDX-B operation (i.e., charge the charge capacitor $C_C$), the tag-IC returns to an OFF state (814).

FDX-B Monoplex Transmission

When configured for FDX-B Monoplex Transmission mode 803, FDX-B transmission occurs with priority when the activation signal level is sufficient to support FDX-B (815), but not additionally HDX transmission (825). No charging of the charge capacitor $C_C$ occurs and HDX signal transmission is inhibited until sufficient activation signal power exists. If the activation signal level increases sufficiently, the tag-IC advances (825) to diplex operation 806.

FDX-B Monoplex Transmission (Delay/Enhance)

FDX-B Monoplex Transmission (Delay/Enhance) mode 803 is similar to the FDX-B Monoplex Transmision Mode described above, except that FDX-B transmission does not commence immediately upon there being sufficient power. Rather, power is accumulated in a charge capacitor $C_C$ 502 during a first interval. Prior to the end of the 50 msec activation signal ON period, the FDX-B signal commences transmission, thereby causing the interrogator to extend its activation signal ON period in accordance with the interrogator's operation that was previously described herein in relationship to FIG. 4. The stored charge in the charge capacitor $C_C$ is used to boost the normal level of the FDX-B signal, thus providing an improvement in FDX-B reading distance. When the interrogator has successfully read the FDX-B tag, or after the activation signal has been present for 100 msec, the interrogator turns the activation signal OFF (816). If the activation signal level increases sufficiently, the tag-IC advances (825) to diplex operation.

HDX Monoplex Transmission

When configured for HDX Monoplex Transmission mode 804, the HDX transmission signal occurs with priority at marginal activation signal levels in response to each activation signal ON cycle (817). FDX-B signal transmission is inhibited inasmuch as the activation signal's power is being accumulated in a charge capacitor $C_C$ for use by the HDX signal transmitter once the activation signal ceases. HDX transmission generally exhibits superior reading distance performance, therefore, many embodiments prefer HDX monoplex over FDX-B monoplex.

FDX-B/HDX Multiplex Transmission

When configured for FDX-B/HDX Multiplex Transmission mode 805, FDX-B and HDX signal transmissions alternate for each activation signal cycle (819). That is, during one cycle, the activation signal is used by the FDX-B transmission function, and HDX operation is inhibited, and during the ensuing activation signal cycle, HDX transmission occurs while FDX-B signal transmission is inhibited.

FDX-B/HDX Multiplex Transmission (Delay/Enhance)

The FDX-B/HDX Multiplex Transmission (Delay/Enhance) mode 805 is similar to the FDX-B/HDX Multiplex Transmission mode 805 described above, except that during each cycle in which FDX-B transmission occurs, FDX-B transmission is delayed and its signal level is enhanced as previously described. HDX transmission occurs as it normally does on cycles alternating with FDX-B.

FDX-B/HDX Diplex Transmission

When configured in FDX-B/HDX Diplex Transmission mode 806, neither FDX-B nor HDX transmission occurs until the activation signal is sufficiently strong to power both functions (821). Once adequately powered, both FDX-B and HDX transmissions occur during every interrogation cycle. While the maximum reading repetition rate for an FDX-B tag using an ISO compliant reader is 1/53 msec, or approximately 19 times per second, and for an HDX tag is 1/70 msec, or approximately 14 times per second, the FDX-B/HDX Diplex Transmission mode is capable of providing a greater reading repetition rate. By transmitting both FDX-B and HDX signals, embodiments of the present invention are capable of sending the identification code twice every 70 msec, or approximately 28 times per second.

While the FDX-B/HDX Diplex Transmission mode results in decreased reading distance inasmuch as transitory states are not traversed, this mode can be advantageous when the tag is deployed in an environment of substantial electrical noise interference. Inasmuch as the electrical noise interferes with tag signal reception by the interrogator, the effective decrease in read range could become subordinate to transmitting both FDX-B and HDX tag signals during every interrogation cycle in order to maximize the repetition rate of tag transmission and signal spectrum diversity.

Once the activation signal increases sufficiently further while the tag-IC is in the diplex transmission mode, the FDX-B transmission's amplitude is enhanced and improves its reading distance.

When configured for any of the above non-singular modes of operation, the transmission mode automatically advances to FDX-B/HDX Diplex Transmission mode 806 as soon as the activation signal strength is sufficient (823, 825, 827) to support the Diplex Transmission mode. Conversely, the FDX-B/HDX Diplex Transmission mode 806 will revert to the monoplex (803, 804) or multiplex transmission mode (805) if and when the activation signal drops below the level required (824, 826, 828) to support the FDX-B/HDX Diplex Transmission mode (or dleay mode discussed below).

FDX-B/HDX Diplex Transmission (Delay)

The FDX-B/HDX Diplex Transmission (Delay) mode 806 provides diplex operation (FDX-B and HDX transmissions both occur for each interrogation cycle), except that FDX-B transmission does not commence immediately upon there being sufficient power. When the activation signal is sufficiently large (821), power is accumulated in a charge capacitor $C_C$ during a first interval. Prior to the end of the 50 msec activation signal ON period, the FDX-B signal commences transmission, thereby causing the interrogator to extend its activation signal ON period in accordance with the interrogator's operation that was previously described herein in relationship to FIG. 4. FDX-B transmission level is not enhanced. The stored charge in charge capacitor $C_C$ is used to power HDX transmission during the same interrogation cycle when the activation signal ceases.

When sufficient power is available to power normal diplex operation, the delay period is automatically eliminated, but is reincorporated when and if activation signal level again becomes marginal.

Selection of Transmission Modes

Operationally, the above transmission modes are managed by an RF threshold detector, such as the RF threshold detector described above in relation to FIG. 5. The RF threshold detector determines when the activation signal level is sufficient to operate the tag-IC in the monoplex or multiplex mode, but is insufficient to support diplex operation. Accordingly, the RF threshold detector acquires the tag configuration status from a configuration memory via a signal input, and implements the corresponding transmission mode for each interrogation cycle and for the activation signal ON and OFF intervals within each interrogation cycle.

For FDX-B monoplex mode, the RF threshold detector inhibits charging of the charge capacitor $C_C$, while proceeding to enable FDX-B transmission as described previously. Subsequently, operation of an HDX ringing oscillator, and related HDX transmission circuitry is disabled via the power management circuit interrogator OFF output during the ensuring activation signal OFF interval.

For HDX monoplex mode, the RF threshold detector inhibits the FDX-B clock recovery and instructs the power management circuit Interrogator OFF output to disable the FDX-B transmission circuitry. The tag's charge capacitor $C_C$ accumulates charge, and the HDX operation proceeds as previously described.

For FDX-B/HDX multiplex mode, the RF threshold detector implements the FDX-B monoplex and HDX monoplex procedures during alternating interrogation cycles. For all three modes—FDX-B monoplex, HDX monoplex, and FDX-B/HDX multiplex, the RF threshold detector enables FDX-B/HDX diplex mode when a sufficient activation signal power exists, and disables the diplex mode when insufficient power exists.

When Delay/Enhance versions of the above modes are selected, the RF threshold detector enables charging of the charge capacitor $C_C$, while inhibiting FDX-B transmission by disabling the FDX-B clock recovery circuit. When the RF threshold detector receives a signal indicating that the charge capacitor $C_C$ is fully charged, FDX-B operation is enabled, and the modulation driver receives an input indicative of an enhanced FDX-B transmit signal.

Although specific operating modes are outlined above, other combinations of operating modes can be used that transition in accordance with the requirements of the application.

Programming

Programming the tag-IC is accomplished wirelessly after it has been attached to an antenna coil and charge capacitor, and preferably after the composite assembly has been packaged. In a number of embodiments, programming involves a three-phase process, that includes (1) configuring the trim tuning capacitor array $C_T$; (2) writing and locking the UID code; and (3) writing and locking the ISO ID codes and configuration bits. In a preferred embodiment, as portrayed in FIG. 7a, there are 7 bits allocated for setting the trim tuning capacitors, 14 bits allocated to configuration control, and 11 bits allocated as lock bits.

Draft ISO Standard 14223 prescribes a physical and logical interface for programmable type transponders that conform to ISO 11784/85, and is incorporated herein by reference in its entirety. ISO 14223 presents interface variants that are compatible with programming FDX-B type tags and HDX type tags. Either of these interface protocols is by itself suitable and sufficient for programming the tag-IC of the present invention. However, in a preferred embodiment, the tag-IC includes both FDX-B and HDX interface protocols inasmuch as the tag-IC can be configured to operate exclusively as either type of tag, and inasmuch as embodiments of the present invention can include the possibility of larger data memory capability that provides for end user programmed data.

In accordance with ISO 14223, the activation signal is puke amplitude modulated in a manner that embeds command and data. Referring to FIG. 5a, the demodulator 513 detects the presence of puke amplitude modulation in the activation signal, and signals the power management circuit 516 via control line 571 to provide power to programming related tag-IC functions by means of a programming output (575).

The demodulator 513 extracts command and data content from the modulated activation signal and passes this information to the read/write control 514 in digital form via a signal (569). The read/write control 514 parses this input signal into command, memory address, and memory data, and subsequently acts accordingly. The read/write control 514 is tailored to accommodate the particular programming needs and characteristics of the memory technology (EEPROM, FeRAM, etc.) implemented in the tag-IC.

The initial post-fabrication bit values of the memory may depend on the particular memory technology used. EEPROM type memory, for example, may have all bits initially set to value 1. FeRAM type memory, on the other hand, may be randomly populated with bit values of 1 and 0, and may need to be erased (e.g., homogeneously programmed with all 1's or all 0's). Other memory technologies may similarly require initial erasure in order to prepare them for programming. All 320 bits in many embodiments of the data memory are presumed not programmed and include entirely bit value 1 states prior to commencement of programming.

Trim Tuning Programming

Optimizing the tuning of an assembled transponder (i.e., an over-molded, glass-encapsulated, or laminated tag attached to an antenna coil and charge capacitor) is performed at the assembly factory. Adjusting the resonant frequency of the tag-IC's antenna circuit ensures that the transponder optimally couples with the interrogator's activation signal, and so that HDX FSK signal frequencies are close to those desired.

In many embodiments, a circuit configuration and tuning method suitable for trim tuning is used that includes an array of binary weighted capacitors having relative values of 1 C, 2 C, 4 C, 8 C, 16 C, 32 C, and 64 C, where C is the value of the smallest capacitance, and whose value is selected based on the values of the antenna $L_R$, capacitor $C_R$, and desired trim resolution. Each of the 7 trim capacitors is wired in series with a transistor switch whose on or off state is controlled by a memory bit. All 7 series wired capacitor/transistor arrangements are wired in parallel with one another and with resonant circuit $L_R/C_R$. By programming the memory, a trim tuning capacitance value ranging for 1 C to 127 C in 1 C increments can be established, thus fine tuning the tag-IC's resonant frequency.

Ideally, the tag-IC produces two HDX FSK frequencies of 134.2 KHz and 124.2 KHz in response to data bit values of 0 and 1, respectively. The trim tuning capacitor array $C_T$ in a preferred embodiment has a tuning resolution of approximately 100 Hz. However, the frequency shifting mechanism is controlled entirely by modulation capacitor $C_M$. Ideally, this capacitor induces a frequency shift of precisely 134.2 KHz minus 124.2 KHz=10.0 KHz. However, the actual frequency shift capacitor $C_M$ induces is a function of the total capacitance, which includes the resonant capacitor $C_R$ and the programmed setting of trim tuning capacitor $C_T$. Consequently, given the fabrication tolerances of these on-chip capacitances, obtaining precise frequencies of 134.2 KHz and 124.2 KHz is statistically improbable.

The tuning process can be implemented in accordance with one of a number of possible alternatives. In the first alternative, the resonant circuit is adjusted to obtain resonance as close to 134.2 KHz as possible, and the frequency resulting for $C_M$ is allowed to produce whatever frequency $C_M$'s actual value produces. This alternative optimizes the transponder's tuning for reception to the activation signal, and for FDX-B transmission.

In the second alternative, rather than tuning the transponder such that the 134.2 KHz frequency is quite precise, tuning is implemented using an ordinary least squares method in which the setting for the trim tuning capacitor array $C_T$ is determined by minimizing the sum of the squares of the differences between the ideal frequencies and the actual frequencies. That is, set the programming of $C_T$ so that $[(134.2 KHz-f_0)^2 +(124.2 KHz-f_1)^2]$ is minimized.

Regardless of which tuning alternative is selected, tag-ICs in accordance with embodiments of the invention provide at least three commands for programming the trim tuning capacitor array $C_T$ 504: (1) set the programming byte value; (2) output frequency $f_0$; and (3) output frequency $f_1$. The commands that output the two FSK frequencies $f_0$ and $f_1$ provide the ability to bypass the ID code memory data and forces the TAG-IC to send data as if the ID Code Memory was set to all 0's (for $f_0$) or all 1's (for $f_1$). By doing this, the values of $f_0$ and $f_1$ can be checked so that the least squares criteria is achieved. Tuning thus becomes an approximation and iterative process.

Specifically, since the tuning range of the trim tuning capacitor array $C_T$ 504 should allow trim tuning in both directions, the value of resonant capacitor $C_R$ 503 when combined with one-half the range value of $C_T$ 504 is by design intended to produce resonance at 134.2 KHz. Consequently, a command is sent to the tag-IC to set the bit in $C_T$ Memory 511c that activates the 64 C $C_T$ capacitor. Then, the tuning procedure includes sending commands that produce the frequencies of $f_0$ and $f_1$ so that they can be measured. Based on the measured values, the required capacitance adjustment value can be calculated and programmed. A second measurement of $f_0$ and $f_1$ is taken, and another $C_T$ setting command is sent. Once $f_0$ and $f_1$ have been set as close as possible to their target values, the $C_T$ memory lock bit (511c) is set.

UID Code Programming

UID code programming is accomplished in an identical fashion as programming the identification (ID) code, but is generally accomplished at the assembly factory at the same time that trim tuning programming is completed. The UID lock bit (511d) is set simultaneously to lock its value and prevent alteration. Programming of the UID code follows the same procedural sequence as that for ID code programming described next.

ID Code Programming

Programming the contents of the ID code memory of a tag-IC in accordance with embodiments of the invention can be accomplished at the assembly factory, or at any regional location where compatible programming equipment is available. Transponders receive data from the programming equipment that set the values of all 256 ID code memory bits and the memory is permanently locked thereafter so that the contents remain unalterable.

In many embodiments of the invention, the tag-IC contains a single ISO compatible ID code programmed into its memory in binary code in both FDX-B and HDX format. For example, the ISO ID code 982123456789012 translates into the following two hexadecimal character stings:

| | |
|---|---|
| FDX-B | 0025 158C CDF6 73AF 8040 7F12 0804 0201 |
| HDX | 0000 E728 5899 7D39 AF00 01F8 2000 0000 |

Figure 7B:
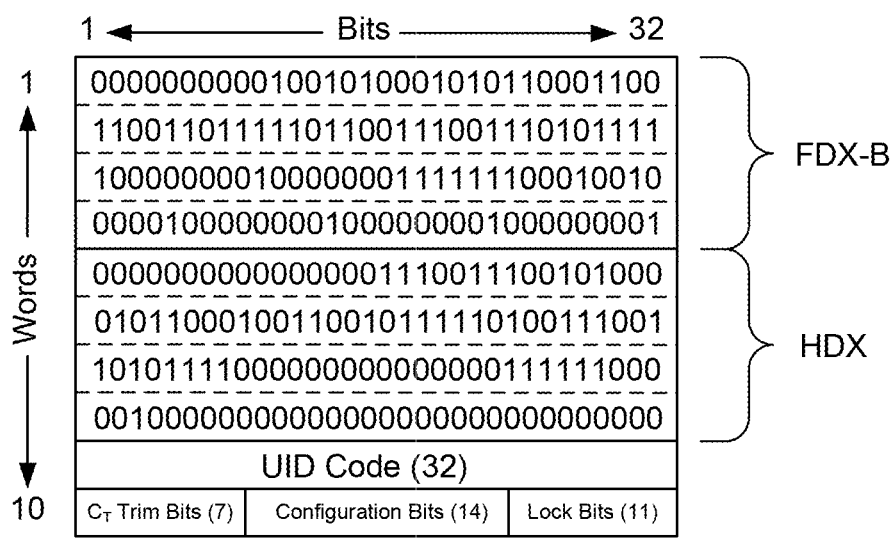
FIG. 7b illustrates an ISO ID Code number programmed in FDX-B and HDX binary coding in an ID Code Memory of a combination HDX/FDX-B transponder in accordance with an embodiment of the invention.

FIG. 7b illustrates how the binary coding of these hexadecimal ID codes would be stored in an ID code memory of an tag-IC in accordance with an embodiment of the invention.

Referring now to FIG. 5e, during programming the charge capacitor $C_C$ 502 accumulates power in response to the interrogation signal, as previously described. Power is developed and regulated accordingly, and the functions associated with the interrogator ON phase are activated. Following the cessation of the constant amplitude and continuous interrogation signal, the interrogation signal commences amplitude modulation with command and data as was previously described. The RF threshold detector 506 determines first that sufficient interrogation signal strength for programming exists, and enables the power management circuit programming output (575) to activate the demodulator 513 and read/write control circuits 514.

The demodulator 513 receives the amplitude modulated interrogation signal, and converts the incoming signal into an 8 bit command instruction. When the command is a write instruction, the demodulator 513 continues converting the incoming signal into binary data, and sends this to the read/write control circuit 514, where 128 bits of data are stored in temporary memory. Upon receipt of all 128 bits, the read/write control circuit sends the data into the ID code memory (511a) via the parallel to serial shift register 512, which now operates in reverse as a serial to parallel shift register. The read/write control circuit 514 coordinates the timing and actions of the address counter 509, shift register 512 and memory (511a) in the transfer of data and the writing of data into memory (511a).

Following the memory write process, the tag-IC sends the ID Code data to the interrogator, and if the data is correct, the interrogator issues an 8 bit command that programs the memory (511a) lock bits so that its contents are permanent. Consequently, programming the memory requires at least three commands: (1) the write command to which the 128 bits of FDX-B ID Code data is appended, (2) the write command to which the 128 bits of HDX ID Code data is appended and (2) the memory lock command.

Obviously the programming sequence and structure of the tag-IC that informs the programming sequence can deviate substantially from that described immediately above while not changing the purpose or end result.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A combined full-duplex and half-duplex identification tag, configured to respond to interrogation cycles that include intervals in which an activation signal is present, and intervals in which the activation signal is absent, the tag comprising:
   an inductive antenna including two terminals connected to tag circuitry, where the tag circuitry is configured to combine with the inductive antenna to form a resonant antenna circuit tuned to resonate at the frequency of the activation signal; and
   a charge capacitor connected to the tag circuitry;
   wherein the tag circuitry includes a non-volatile memory containing full-duplex identification data and half-duplex identification data;
   wherein the tag circuitry includes an RF threshold detector configured to determine the magnitude of the potential difference induced across the terminals of the inductive antenna by the activation signal;
   wherein the tag circuitry is configured to be powered by electric current induced in the inductive antenna by the activation signal;
   wherein the tag circuitry includes at least one switchable load impedance connected across the antenna resonant circuit;
   wherein the tag circuitry and the resonant antenna circuitry are configurable as an oscillator;
   wherein the tag circuitry is configured so that the tag circuitry amplitude modulates the activation signal using a switchable load impedance with a sequence indicative of the full-duplex identification data when the RF threshold detector detects that the amplitude of the potential difference induced across the terminals of the inductive antenna is below a full-duplex mode threshold;
   wherein the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during alternating repetitions of the interrogation cycle when the RF threshold detector detects that the amplitude of the potential difference induced across the terminals of the inductive antenna is at least above the full-duplex mode threshold and is below a multiplex mode threshold; and
   wherein the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during each repetition of the interrogation cycle when the RF threshold detector detects that the amplitude of the potential difference induced across the terminals of the inductive antenna is at least above the multiplex mode threshold.

2. The identification tag of claim 1, wherein
   the tag circuitry is configured to store at least some of the electric current induced in the inductive antenna by the activation signal;
   the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the full-duplex mode threshold and is below a full-duplex enhanced mode threshold;
   the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the multiple mode threshold and is below the multiplex enhanced mode threshold; and the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above a diplex mode threshold.

3. A combined full-duplex and half-duplex identification tag, configured to respond interrogation cycles that include intervals in which an activation signal is present, and intervals in which an activation signal is absent, the tag comprising:

an inductive antenna including two terminals connected to tag circuitry, where the tag circuitry is configured to combine with the inductive antenna to form a resonant antenna circuit tuned to resonate at the frequency of the activation signal; and a charge capacitor connected to the tag circuitry;

wherein the tag circuitry includes at least one switchable load impedance connected across the antenna resonant circuit;

wherein the tag circuitry includes a non-volatile memory containing full-duplex identification data and half-duplex identification data;

wherein the tag circuitry is configured to receive power from electric current induced in the inductive antenna by the periodic activation signal;

wherein the tag circuitry is configured to store electrical current induced in the inductive antenna by the activation signal on the charge capacitor;

wherein the tag circuitry includes at least one switchable load impedance connected across the antenna resonant circuit;

wherein the tag circuitry and the resonant antenna circuitry are configurable as an oscillator;

wherein the tag circuitry is configured so that the tag circuitry frequency shift key modulates an oscillator signal appearing at the resonant antenna circuit terminals with a sequence indicative of the half-duplex identification data using a switchable load impedance when the RF threshold detector detects that the amplitude of the potential difference induced across the terminals of the inductive antenna is below an half-duplex mode threshold;

wherein the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during alternating repetitions of the interrogation cycle when the RF threshold detector detects that the amplitude of the potential difference induced across the terminals of the inductive antenna is at least above the half-duplex mode threshold and is below an multiplex mode threshold; and wherein the tag circuitry is configured so that the tag circuitry amplitude modulates the activation signal with a sequence indicative of the full-duplex identification data using the switchable load impedance and frequency shift key modulates an oscillator signal appearing at the resonant antenna circuit terminals with a sequence indicative of the half-duplex identification data using a switchable load impedance during each repetition of the interrogation cycle when the RF threshold detector detects that the amplitude of the potential difference induced across the terminals of the inductive antenna is at least above the multiplex mode threshold.

4. The identification tag of claim 2, wherein the tag circuitry is configured to utilize charge stored on the charge capacitor to increase the modulation index of at least a portion of the amplitude modulated activation signal when the RF threshold detector detects that the amplitude of the potential difference induced across the terminals of the inductive antenna is above the multiple mode threshold and is below the multiplex enhanced mode threshold; and the tag circuitry is configured to utilize charge stored on the charge capacitor to increase the modulation index of at least a portion of the amplitude modulated activation signal when RF threshold detector detects that the amplitude of the potential difference induced across the terminals of the inductive antenna above a diplex mode threshold.

5. The identification tag of claim 1, wherein the full-duplex identification data and the half-duplex identification data are identical.

* * * * *

UNITED STATES PATENT AND TRADEMARK OFFICE
CERTIFICATE OF CORRECTION

PATENT NO. : 8,581,705 B2  
APPLICATION NO. : 12/554743  
DATED : November 12, 2013  
INVENTOR(S) : Robert Stewart Page 1 of 1

It is certified that error appears in the above-identified patent and that said Letters Patent is hereby corrected as shown below:

In the Specification

Col. 2, line 3, delete "5,302,964" and add --5,302,954--

Col. 2, line 33, delete "3,713,146" and add --3,713,148--

Signed and Sealed this
First Day of March, 2016

Michelle K. Lee
*Director of the United States Patent and Trademark Office*